US012648663B2

(12) United States Patent
Scalf et al.

(10) Patent No.: US 12,648,663 B2
(45) Date of Patent: Jun. 9, 2026

(54) PRESSURE COOKER WITH VAPOR COMPRESSION COOLING SYSTEM

(71) Applicant: Midea Group Co., Ltd., Beijiao (CN)

(72) Inventors: Eric L. Scalf, Louisville, KY (US); Brian M. Langness, Shelbyville, KY (US)

(73) Assignee: MIDEA GROUP CO., LTD., Beijiao (CN)

( * ) Notice: Subject to any disclaimer, the term of this patent is extended or adjusted under 35 U.S.C. 154(b) by 648 days.

(21) Appl. No.: 18/194,003

(22) Filed: Mar. 31, 2023

(65) Prior Publication Data

US 2024/0324805 A1     Oct. 3, 2024

(51) Int. Cl.
| | |
|---|---|
| *A47J 27/08* | (2006.01) |
| *A23G 9/04* | (2006.01) |
| *A47J 27/086* | (2006.01) |
| *A47J 27/62* | (2006.01) |
| *A47J 36/24* | (2006.01) |
| *F25B 3/00* | (2006.01) |
| *F25B 29/00* | (2006.01) |

(52) U.S. Cl.
CPC ............ *A47J 27/0802* (2013.01); *A23G 9/04* (2013.01); *A47J 27/086* (2013.01); *A47J 27/62* (2013.01); *A47J 36/2483* (2013.01); *F25B 3/00* (2013.01); *F25B 29/003* (2013.01)

(58) Field of Classification Search
None
See application file for complete search history.

(56) References Cited

U.S. PATENT DOCUMENTS

| | | | |
|---|---|---|---|
| 4,676,283 A | 6/1987 | Caldwell | |
| 4,815,287 A | * 3/1989 | O'Daniel | F25D 3/08 62/529 |
| 6,085,535 A | * 7/2000 | Richmond | A47F 3/0452 220/592.15 |

(Continued)

FOREIGN PATENT DOCUMENTS

| | | | |
|---|---|---|---|
| CN | 201977552 U | * 9/2011 | |
| CN | 106136873 A | 11/2016 | |

(Continued)

OTHER PUBLICATIONS

Gourmia; Cool Cooking and IoT Innovation from Gourmia Gives Chefs the Ultimate Control; retrieved from Gourmia.com; dated Feb. 20, 2019.

(Continued)

*Primary Examiner* — Thor S Campbell
(74) *Attorney, Agent, or Firm* — Gray Ice Higdon

(57) ABSTRACT

A pressure cooker utilizes a vapor compression cooling system that is physically separate from the heating element that heats the bottom of a crock and includes a cooling coil that circumscribes the side wall(s) of the crock to cool the crock through the circulation of a fluid through the cooling coil. Such a vapor compression cooling system may be used to provide various functions in a pressure cooker, including, for example, refrigerating food during a delay portion of a delay pressure cooking operation, accelerating depressurization during a depressurization portion of a pressure cooking operation, and performing a cooler operation to chill liquids, beverages, and the like.

19 Claims, 10 Drawing Sheets

(56) References Cited

U.S. PATENT DOCUMENTS

| | | | | |
|---|---|---|---|---|
| 6,145,333 | A * | 11/2000 | Richmond | A47F 3/0452 |
| | | | | 219/385 |
| 6,213,007 | B1 | 4/2001 | Lande | |
| 6,434,961 | B2 * | 8/2002 | Richmond | F25D 23/061 |
| | | | | 219/385 |
| 6,735,971 | B2 * | 5/2004 | Monroe | A47F 10/06 |
| | | | | 62/446 |
| 7,174,720 | B2 * | 2/2007 | Kennedy | A47J 36/321 |
| | | | | 62/3.3 |
| 7,718,928 | B2 | 5/2010 | He et al. | |
| 10,856,687 | B1 * | 12/2020 | Sargent | A47J 36/321 |
| 11,202,528 | B2 | 12/2021 | Bang et al. | |
| 12,215,898 | B2 | 2/2025 | Itzkowitz | |
| 12,372,292 | B2 * | 7/2025 | Pijnenburg | A23B 7/158 |
| 12,478,216 | B2 * | 11/2025 | Bigott | A47J 36/2483 |
| 2005/0121020 | A1 * | 6/2005 | McLemore | A47J 37/0704 |
| | | | | 126/304 R |
| 2009/0152258 | A1 * | 6/2009 | Schandel | A47J 27/004 |
| | | | | 219/439 |
| 2012/0230868 | A1 * | 9/2012 | Reddy | A61L 2/07 |
| | | | | 422/26 |
| 2014/0044851 | A1 * | 2/2014 | Kennedy | A47J 36/321 |
| | | | | 99/332 |
| 2015/0201808 | A1 | 7/2015 | Katsuki | |
| 2016/0123660 | A1 * | 5/2016 | Peng | A47J 27/004 |
| | | | | 219/623 |
| 2018/0028012 | A1 * | 2/2018 | Junge | A47J 27/004 |
| 2019/0269272 | A1 * | 9/2019 | Itzkowitz | A47J 36/321 |
| 2020/0221900 | A1 * | 7/2020 | Itzkowitz | A47J 36/06 |
| 2020/0224934 | A1 * | 7/2020 | Itzkowitz | A47J 27/08 |
| 2021/0137298 | A1 * | 5/2021 | Zakowski | A47J 36/16 |
| 2021/0259453 | A1 | 8/2021 | Newhouse et al. | |
| 2022/0095833 | A1 * | 3/2022 | Caruso | A47J 37/0641 |
| 2023/0015314 | A1 * | 1/2023 | Hietbrink | F24C 15/322 |
| 2023/0131171 | A1 * | 4/2023 | Martin | A47J 37/0641 |
| | | | | 426/523 |
| 2024/0197102 | A1 * | 6/2024 | LePinske | A47J 27/0802 |
| 2024/0324805 | A1 * | 10/2024 | Scalf | A47J 36/2483 |
| 2024/0324806 | A1 | 10/2024 | Scalf | |
| 2024/0324808 | A1 | 10/2024 | Scalf | |
| 2024/0324809 | A1 | 10/2024 | Scalf | |
| 2025/0380835 | A1 * | 12/2025 | Betancourt | A47J 37/0641 |

FOREIGN PATENT DOCUMENTS

| | | |
|---|---|---|
| CN | 106175423 A | 12/2016 |
| CN | 109452852 A | 3/2019 |
| CN | 211432570 U | 9/2020 |
| CN | 211212607 U | 11/2020 |
| CN | 214510746 U | 10/2021 |
| CN | 115486692 A | 12/2022 |
| CN | 218164880 U | 12/2022 |
| CN | 117502894 A | 2/2024 |
| EP | 2606776 A1 | 6/2013 |
| EP | 3479741 A1 | 5/2019 |
| JP | 2019118481 A | 7/2019 |
| KR | 200366222 Y1 | 11/2004 |
| WO | 2019026018 A1 | 2/2019 |

OTHER PUBLICATIONS

Thermomix; TM6—Meet Your Kitchen Assistant; retrieved from https://www.thermomix.com/tm6/; retrieved on Mar. 30, 2023.
Related Applications Transmittal Apr. 18, 2023.
Nguyen, Hung D., United States Patent and Trademark Office, Non-Final Office Action issued in U.S. Appl. No. 18/194,025, 449 pages, dated Jan. 9, 2026.
Campbell, Thor S., United States Patent and Trademark Office, Non-Final Office Action issued in U.S. Appl. No. 18/194,356, 48 pages, dated Feb. 19, 2026.

* cited by examiner

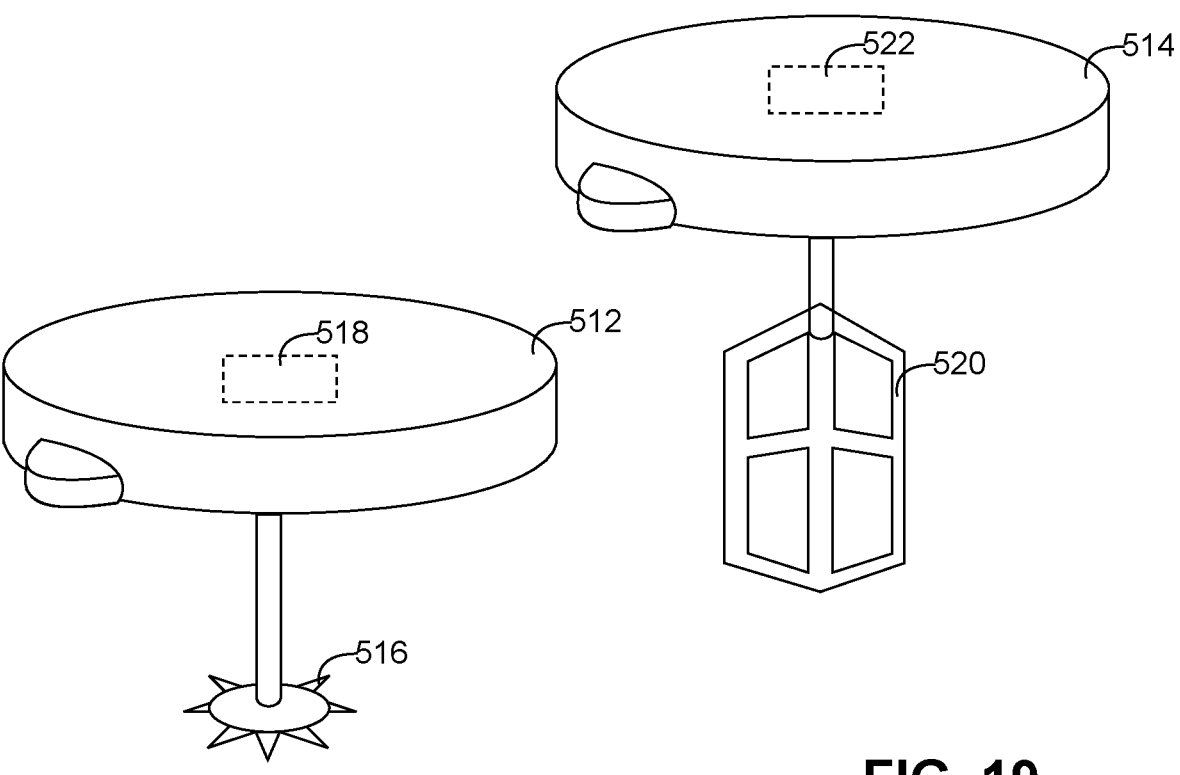
FIG. 19
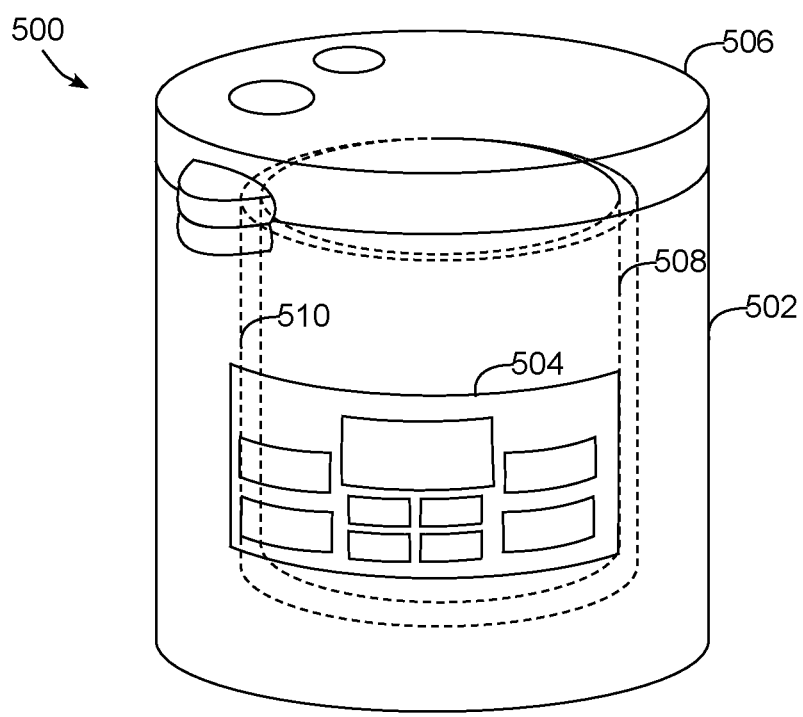

PRESSURE COOKER WITH VAPOR COMPRESSION COOLING SYSTEM

BACKGROUND

Pressure cookers are popular appliances for cooking food conveniently and quickly. While some pressure cookers are utensils that rely on heat supplied by a stovetop or grill, many pressure cookers, which may also be referred to as electric pressure cookers, are standalone countertop cooking appliances that are powered by household electricity.

An electric-type pressure cooker generally incorporates a housing having a heating element and within which is placed a metal crock that contains food to be cooked. A lid is placed on the housing and forms a seal with the metal crock such that when the crock is heated, steam released via the cooking process as liquid boils increases the pressure within the crock, and allows the temperature of the steam and liquids within the crock to increase beyond the boiling point of water at atmospheric pressure, resulting in faster cooking. Some pressure cookers also support additional types of cooking operations, such as slow cooking and/or sautéing, which are generally performed with the lid off (and thus at atmospheric pressure), as well as other functions such as air frying, generally performed using a different lid. These latter pressure cookers are also known as multi-cookers due to the additional types of cooking operations they support; however, for the purposes of this disclosure, the term "pressure cooker" may be considered to be any appliance that is capable of performing pressure cooking operations, irrespective of whether any other types of cooking operations are also supported.

While many pressure cookers offer faster cooking for some types of food, a common problem with such pressure cookers is the length of time required for the pressure cookers to pressurize and depressurize at the beginning and end of a pressure cooking operation. Further, during initial heating, moisture is continually being exhausted until the seal is established by the lid, sometimes resulting in excessive moisture loss. At the end of a pressure cooking operation, the seal is maintained until the temperature, and thus the pressure, within the crock falls below a particular threshold. While many pressure cookers incorporate quick release valves, for some recipes, it is desirable to allow the pressure to decrease naturally. However, in some instances the amount of time required for the pressure to sufficiently decrease is still undesirably long.

Therefore, a significant need exists in the art for a manner of improving pressure cooker performance, particularly with respect to improving the rate of pressurization and/or depressurization at the beginning and/or end of a pressure cooking operation.

SUMMARY

The herein-described embodiments address these and other problems associated with the art by providing a pressure cooker that utilizes a vapor compression cooling system that is physically separate from the heating element that heats the bottom of a crock and includes a cooling coil that circumscribes the side wall(s) of the crock to cool the crock through the circulation of a fluid through the cooling coil. Such a vapor compression cooling system may be used to provide various functions in a pressure cooker, including, for example, refrigerating food during a delay portion of a delay pressure cooking operation, accelerating depressurization during a depressurization portion of a pressure cooking operation, and performing a cooler operation to chill liquids, beverages, and the like.

Therefore, consistent with one aspect of the invention, a pressure cooker may include a housing including an outer chamber, a crock supported within the outer chamber of the housing, the crock including at least one side wall and a bottom wall defining a cooking chamber, a lid removably secured to the housing and configured to seal the cooking chamber, a heating element coupled to the housing and positioned opposite the bottom wall of the crock to heat the cooking chamber, and a vapor compression cooling system coupled to the housing and including a cooling coil circumscribing the at least one side wall of the crock to cool the at least one side wall of the crock by circulating fluid through the cooling coil.

In some embodiments, the vapor compression cooling system includes a vapor compression circuit including a compressor, a condenser, and an expansion valve through which a refrigerant circulates. Also, in some embodiments, the cooling coil includes an evaporator of the vapor compression circuit, and the refrigerant is the fluid circulated through the cooling coil. Further, in some embodiments, the vapor compression circuit further includes an evaporator through which the refrigerant circulates, the vapor compression cooling system further includes a liquid chiller loop including a pump configured to circulate a liquid chilled by the evaporator of the vapor compression circuit, and the cooling coil is disposed in the liquid chiller loop and the liquid is the fluid circulated through the cooling coil.

In some embodiments, the compressor, condenser, and expansion valve are disposed within the housing. In addition, in some embodiments, the condenser is disposed on an outer housing wall of the housing. In some embodiments, at least a portion of the vapor compression circuit is disposed externally from the housing. In addition, in some embodiments, the at least a portion of the vapor compression circuit is removably coupled to the housing.

Moreover, in some embodiments, the outer chamber is defined by an inner housing wall of the housing, and the cooling coil is coupled to the inner housing wall. In some embodiments, the housing further includes an outer housing wall, and the cooling coil is disposed between the inner housing wall and the outer housing wall. Moreover, in some embodiments, the cooling coil is disposed between the inner housing wall and the crock.

Some embodiments may also include at least one heat pipe coupled to the inner housing wall of the housing wall. In some embodiments, the cooling coil is wound helically about the at least one side wall of the crock. In addition, in some embodiments, the housing includes one or more helical air channels defined between portions of the cooling coil, and the pressure cooker further includes a housing fan disposed in the housing and configured to circulate air through the one or more helical air channels.

Some embodiments may also include a controller coupled to the heating element and the vapor compression cooling system, and the controller is configured to selectively activate the heating element and the vapor compression cooling system during a pressure cooking operation. Moreover, in some embodiments, the pressure cooking operation is a delay pressure cooking operation, and the controller is configured to activate the vapor compression cooling system during a delay portion of the delay pressure cooking operation to refrigerate food in the crock during the delay portion of the delay pressure cooking operation. Also, in some embodiments, the controller is configured to activate the vapor compression cooling system during a depressurization portion of the pressure cooking operation to accelerate depressurization of the crock.

In some embodiments, the vapor compression cooling system is operable in a reverse heat pump mode, and the controller is configured to activate the vapor compression cooling system in the reverse heat pump mode to perform a warming operation in the crock. In addition, in some embodiments, the controller is configured to activate the vapor compression cooling system to perform a cooler operation in the crock. In addition, some embodiments may further include a specialty lid including an ice cream making, mixing or blending function, and the controller is further configured to activate the vapor compression cooling system when the specialty lid is mounted to the housing to perform an ice cream making operation, a mixing operation, or a blending operation in the crock.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIG. 19 is a front perspective view of another pressure cooker consistent with some embodiments of the invention, and including multiple interchangeable lids.

DETAILED DESCRIPTION

Figure 1:
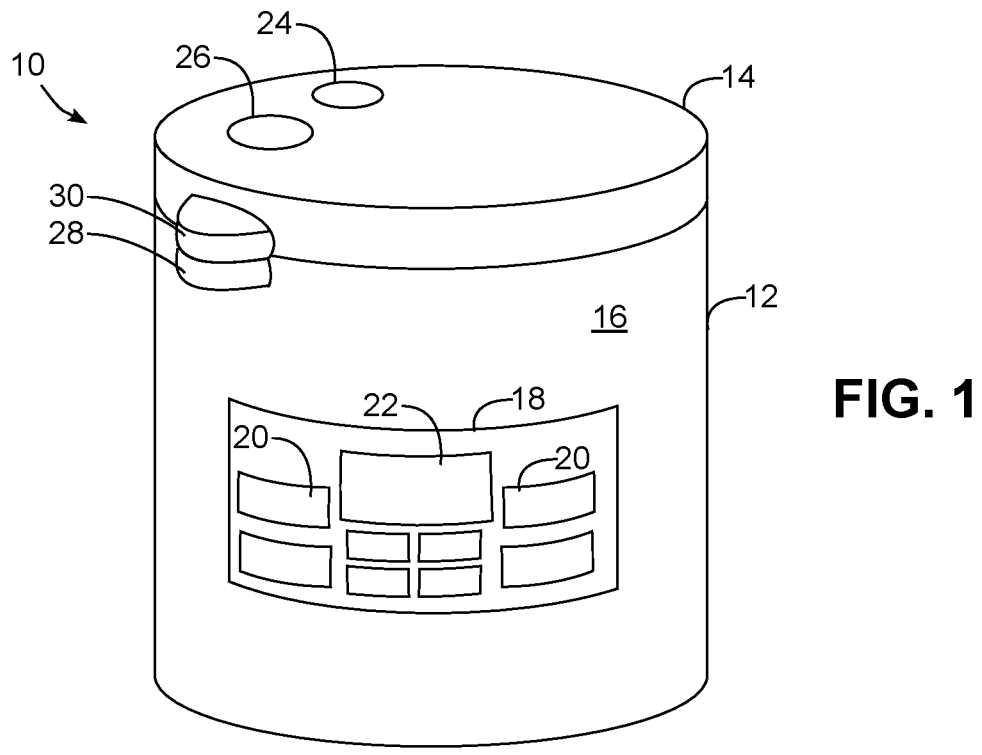
FIG. 1 is a front perspective view of a pressure cooker consistent with some embodiments of the invention.

Now turning to the drawings, wherein like parts are denoted by like numbers throughout the several views, FIG. 1 illustrates a pressure cooker 10 consistent with some embodiments of the invention. Pressure cooker 10 may also be referred to interchangeably as an electric pressure cooker or a multi-cooker in some embodiments. Pressure cooker 10 is illustrated as incorporating a number of features disclosed herein; however, it will be appreciated that these features generally may implemented separately from one another in other embodiments, so the invention is not limited to a pressure cooker incorporating all of the features of pressure cooker 10.

Pressure cooker 10 may include a base or housing 12 along with a removable lid 14 mounted thereto. Lid 14 may be removable mounted in a number of manners suitable for maintaining a suitable seal with housing 12, e.g., through a threaded engagement that requires rotation of the lid in order to fully engage the lid and housing with one another. Housing 12 includes an outer housing wall 16 upon which is disposed a user interface 18, e.g., a control panel including one or more user controls 20 (e.g., various combinations of buttons, sliders, knobs, switches, touchscreens, etc.) and one or more displays 22 (e.g., indicators, speakers, LEDs, touchscreens, etc.).

Lid 14 may include various valves and pressure release structures, e.g., a float valve 24 and quick release exhaust valve 26, the use and configuration of which are understood by those of ordinary skill having the benefit of the instant disclosure. One or more handles, e.g., handles 28, 30, may be disposed on housing 12 and/or lid 14 to facilitate securing and removing lid 14 and/or lifting and carrying housing 12 and/or lid 14.

Figure 2:
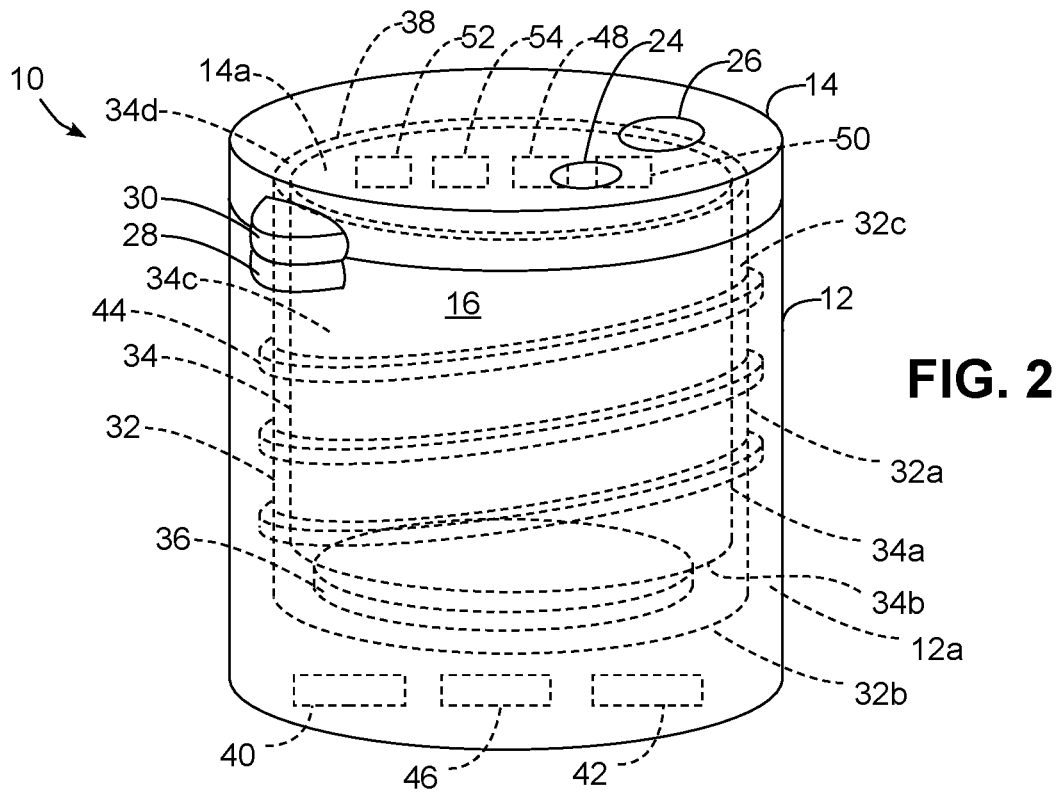
FIG. 2 is a rear perspective view of the pressure cooker of FIG. 1.

With additional reference to FIG. 2, which illustrates a number of components internal to pressure cooker 10, housing 12 also includes an inner housing wall 32, which in many instances includes a substantially cylindrical sidewall 32a and substantially planar bottom wall 32b that define a substantially cylindrical outer chamber 32*c*, and which in some embodiments is referred to as an outer or exterior pot. An interior 12*a* of housing 12 may be defined between outer and inner housing walls 16, 32, and may house a number of components of pressure cooker 10, as discussed in greater detail below.

An inner pot or crock 34, which includes a substantially cylindrical side wall 34*a* and substantially planar bottom wall 34*b*, is received within outer chamber 32*c*, and is used to contain the food to be cooked during a pressure cooking operation. A heating element 36, which in many instances is a resistive heating element driven by electrical current, is positioned below bottom wall 34*b* of crock 34, generally within chamber 32*a* of inner housing wall 32, although in other embodiments heating element 36 may define a portion of inner housing wall 32 or may be positioned underneath inner housing wall 32, and thus positioned within the space defined between outer and inner housing walls 16, 32.

During a pressure cooking operation, a top rim 34*d* of crock 34 engages a seal 38 supported by lid 14 to form, along with a bottom surface 14*a* of lid 14, a sealed and pressurized cooking chamber 34*c* in crock 34 as heat is supplied to crock 34 by heating element 36. Control over a pressure cooking operation is managed by a controller 40 disposed in housing 12 that controls activation of heating element 36. Controller 40 is also configured to utilize a number of additional features discussed in greater detail below, many of which may be suitable for accelerating one or both of pressurization and depressurization of pressure cooker 10 at the beginning and end of a pressure cooking operation.

For example, in some embodiments, a vapor compression cooling system 42 may be incorporated into pressure cooker 10 to cool crock 34. In the illustrated embodiment of FIGS. 1-2, vapor compression cooling system 42 includes a helical cooling coil 44 that wraps around side wall 34*a* of crock 34 and functions as an evaporator of vapor compression cooling system 42. Cooling coil 44 therefore applies cooling to side wall 34*a* of crock 34, and is physically separated from heating element 36, which applies heat to bottom wall 34*b* of crock 34. As will become more apparent below, vapor compression cooling system 42 may be used in various embodiments to accelerate cooling and depressurization at the end of a pressure cooking operation and/or to cool food housed in crock 34 prior to pressure cooking, e.g., in a delayed pressure cooking operation. In addition, in some embodiments, a vapor compression cooling system 42 may be used in a reverse heat pump mode to provide a warming function in crock 34, e.g., after completion of a pressure cooking operation, as a separate warming operation performed to keep food warm in the crock, e.g., for serving.

In addition, in some embodiments, a housing fan 46 may be incorporated into pressure cooker 10 to direct airflow through at least a portion of interior 12*a*, and in some instances, within outer chamber 32*c*, between inner housing wall 32 and crock 34 (e.g., between side wall 32*a* and side wall 34*a*). As will become more apparent below, in some embodiments, housing fan 46 may be configured to draw in external air proximate a top of the pressure cooker and downwardly through housing 12 and exhaust the air proximate the bottom of the pressure cooker, which in some instances may additionally be useful for collecting smoke or steam generated by slow cooking or sautéing cooking operations performed with the pressure cooker. In addition, in some embodiments, housing fan 46 may be reversible to permit both downward and upward airflow.

Furthermore, in some embodiments, it may be desirable to incorporate one or more additional components into lid 14 to provide additional functionality for pressure cooker 10. For example, it may be desirable in some embodiments to incorporate, into lid 14, a lid pump 48 that is in fluid communication with cooking chamber 34*c* and is configured to pressurize the cooking chamber during a pressure cooking operation. In addition, one or more additional components, e.g., an exhaust valve actuator 50, a temperature sensor 52 and/or a pressure sensor 54, may also be incorporated into lid 14. Exhaust valve actuator 50 may be implemented, for example, as an electrically-actuated solenoid, and may be configured to actuate quick release exhaust valve 26 to release pressure from cooking chamber 34*c*. Temperature sensor 52 and pressure sensor 54 may be positioned in lid 14 to sense temperature and pressure in cooking chamber 34*c*, respectively. Other components that may be incorporated into lid 14 are discussed in greater detail below.

Figures 3, 4, 5:
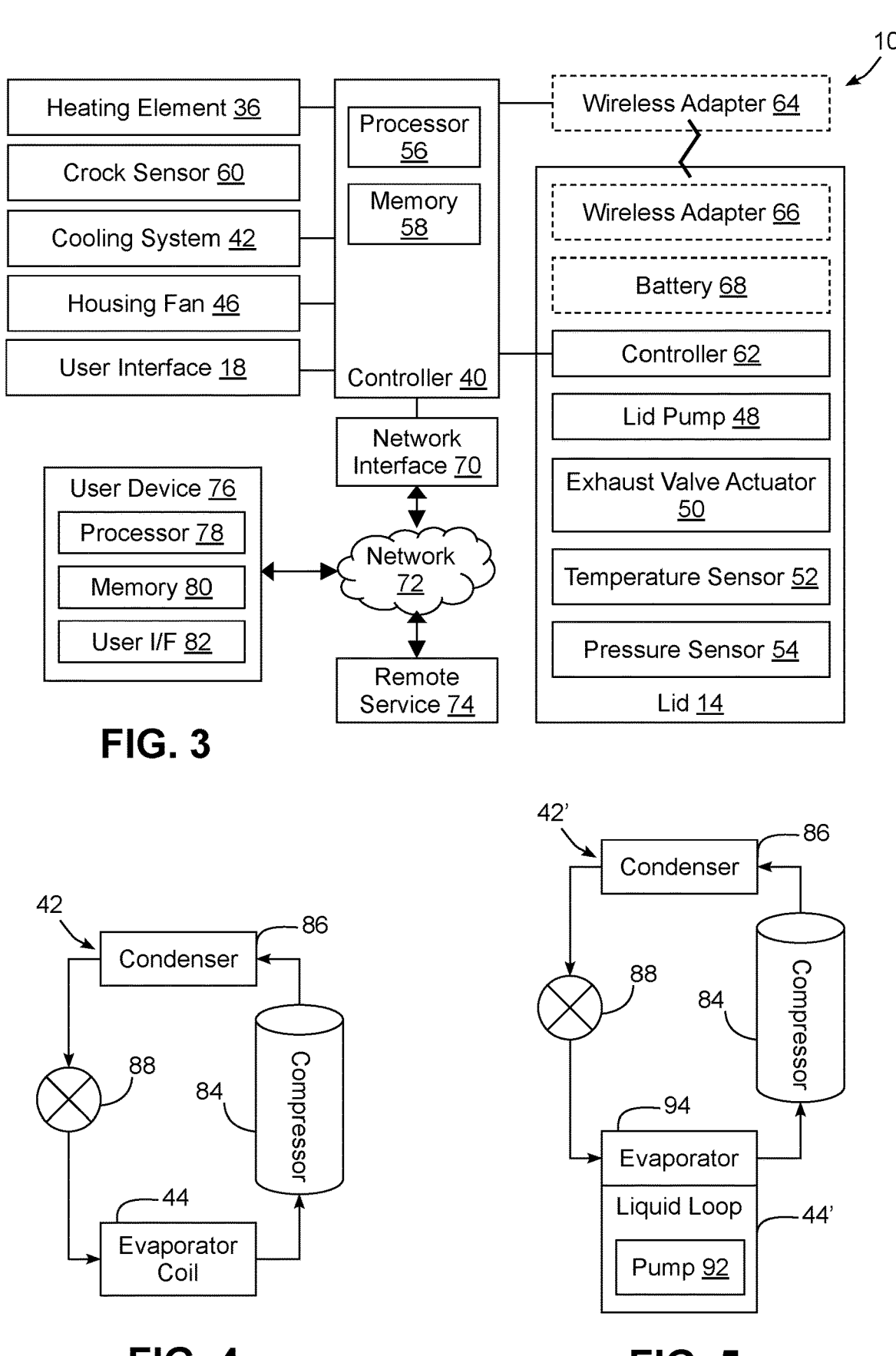
FIG. 3 is a block diagram of an example control system for the pressure cooker of FIGS. 1-2.
FIG. 4 is a block diagram of an example implementation of the cooling system of the pressure cooker of FIGS. 1-3.
FIG. 5 is a block diagram of an alternate implementation of the cooling system of FIG. 4.

Now turning to FIG. 3, an example control system for controlling pressure cooker 10 is illustrated in greater detail. In particular, pressure cooker 10 may be under the control of controller 40, which receives inputs from a number of components and drives a number of components in response thereto. Controller 40 may, for example, include one or more processors 56 and a memory 58 within which may be stored program code or instructions for execution by the one or more processors 56. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40. Controller 40 may also be implemented as a microcontroller in some embodiments, and as such these terms are used interchangeably herein. Controller 40 may also include discrete circuit logic in some embodiments, e.g., including passive and/or active circuit components.

As shown in FIG. 3, controller 40 may be interfaced with various components, including the aforementioned user interface 18, heating element 36, cooling system 42, and housing fan 46. In addition, controller 40 may be interfaced with additional sensors in the housing, including, for example, a crock sensor 60 used to sense the presence of crock 34 within outer chamber 32*c*. In some embodiments, for example, a crock sensor 60 may be configured to activate when bottom wall 34*b* of crock 34 touches or is otherwise positioned adjacent heating element 36 and/or bottom wall 32*b* of inner housing wall 32. Other types and/or locations of crock sensors, as well as other sensors commonly utilized in pressure cookers, may be used in other embodiments, as will be appreciated by those of ordinary skill having the benefit of the instant disclosure.

In addition, controller 40 is interfaced with one or more electronic components disposed in or on lid 14, including the aforementioned lid pump 48, exhaust valve actuator 50, temperature sensor 52 and pressure sensor 54. In some embodiments, lid 14 may also include a controller 62 capable of routing commands, status information, sensor readings, and other data between controller 40 and components 48-54. In addition, while dedicated wires may be used in some embodiments to communicate data between controller 40 and lid 14, since lid 14 is generally removable from housing 12 in many embodiments, various other manners of communicating data between lid 14 and controller 40 may be used. For example, one or more sets of opposing electrical contacts may be used in some embodiments to place controller 40 and lid 14 into communication with one another when lid 14 is secured into a pressure cooking position. Alternatively, as illustrated in FIG. 3, a pair of wireless adapters 64, 66 may be coupled to controller 40 and lid 14 to communicate data wirelessly, such that no physical electrical connections are utilized between the lid and housing. In such embodiments, it may also be desirable to include a battery 68 or other power storage element to provide power both for wireless communication and for the other components 48-54 in lid 14. Battery 68 may be replaceable or rechargeable in some embodiments. In addition, in some embodiments, a combination of physical electrical contacts and wireless communication may be used, e.g., where electrical power is supplied via electrical contacts but data is communicated wirelessly.

Controller 40 may also communicate with various external devices, e.g., using a network interface 70 coupled to a network 72. Network interface 70, for example, may represent one or more network interfaces suitable for interfacing with external devices via wired and/or wireless networks such as Ethernet, Wi-Fi, Bluetooth, NFC, cellular and other suitable networks. It may be desirable, for example, to interface with one or more remote services 74, e.g., to obtain firmware updates, to access remote databases with recipes, to provide maintenance or diagnostic functionality, etc. It may also be desirable to interface with one or more user devices 76, e.g., a consumer's mobile phone, which may include one or more processors 78, a memory 80 and a user interface 82 (e.g., a touchscreen display) to enable a customer to control pressure cooker 10 and/or receive status information through the user device 76. Moreover, in some embodiments, at least a portion of controller 40 may be implemented externally, e.g., within a mobile device, a cloud computing environment, etc., such that at least a portion of the functionality described herein is implemented within the portion of the controller that is externally implemented.

In some embodiments, controller 40 (as well as controller 62 and/or processor 78 of user device 76 or a processor of remote service 74) may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the operational sequences performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous additional variations and modifications to pressure cooker 10 as illustrated in FIGS. 1-3 will be apparent to those of ordinary skill having the benefit of the instant disclosure, as will become apparent from the description below. Therefore, the invention is not limited to the specific implementations discussed herein.

Vapor Compression Cooling System

As noted above, in some embodiments, it may be desirable to utilize a vapor compression cooling system in a pressure cooker to provide cooling functionality in the pressure cooker. When used in combination with a heating element positioned towards the bottom of the housing, e.g., opposite the bottom wall of the crock, a vapor compression cooling system may be configured with a cooling coil that circumscribes one or more side walls of a crock to cool the side wall(s) through the circulation of fluid (e.g., a refrigerant, a liquid, a gas, etc.) through the cooling coil.

In some embodiments, e.g., as illustrated in FIG. 2, a cooling coil 44 may be wound helically (e.g., from bottom to top in some embodiments) about the circumference of the cylindrical side wall 34*b* of crock 34, while in other embodiments, other cooling coil configurations may be used. For example, a cooling coil in some embodiments may extend in a similar manner to a waveform (e.g. a sine wave, a square wave, etc.) for a single loop around the crock, while in other embodiments, multiple loops may be combined. In general a cooling coil desirably extends along a substantial portion of the side wall of crock 34 to evenly distribute cooling across the side wall, so various coil configurations that achieve such coverage may be used. A cooling coil may also, in some embodiments, additionally cool portions of the bottom wall of crock 34, although the invention is not limited as such.

In addition, while a cooling coil in some embodiments may be disposed within outer chamber 32*c*, e.g., attached to side wall 32*a* of inner housing wall 32, in the embodiment illustrated in FIG. 2, cooling coil 44 is disposed within interior 12*a* of housing 12, e.g., mounted to or otherwise in connect with a backside of inner housing wall 32, which, due to the temperatures to which it is subjected during pressure cooking operations, is generally metallic in nature.

Cooling coil 44, in some embodiments, may be configured as an evaporator coil in a vapor compression circuit, and the fluid that may be circulated through the cooling coil may be a refrigerant for the vapor compression circuit. FIG. 4, for example, illustrates vapor compression cooling system 42 in greater detail, whereby refrigerant is drawn from cooling coil 42, acting as an evaporator coil, by a compressor 84, which compresses the fluid to generate heat that is exchanged with the ambient environment by a condenser 86, and then fed to an expansion valve 88 that feeds cooling coil 42, such that the expansion of refrigerant draws heat from the area surrounding the cooling coil, including crock 34.

Alternatively, and as illustrated by cooling system 42' of FIG. 5, rather than serving as the evaporator coil for a vapor compression circuit, a cooling coil may be configured to circulate a fluid in a liquid chiller loop arrangement 44', whereby a liquid chiller pump 92 circulates a fluid in the liquid chiller loop that is cooled by a separate evaporator 94 of the vapor compression circuit, such that the cooling coil is indirectly cooled by the vapor compression circuit.

In either event, however, the use of a cooling coil that circumscribes the side wall(s) of a crock provides a number of benefits. First, the surface area of the side wall(s) of a crock are generally 3 to 4 times the area of the bottom wall of a typical 10-12 inch pressure cooker crock, such that the larger surface area provides a comparatively larger cooling surface, and thus an overall larger cooling capacity, as opposed to if cooling was integrated into the base of the housing and used to cool the bottom wall of the crock. In addition, evenness achieved by cooling the side wall(s)

rather than the bottom wall of the crock potentially enables more functionality such as ice cream freezing that may not be achievable when only the bottom wall is cooled, as when only the bottom wall is cooled, much of the food is too distant from the sub-freezing temperature of the walls of the crock for effective freezing.

Another benefit is realized at the end of a pressure cooking operation, as chilling the side wall(s) of a crock may be used to accelerate cooling and depressurization. Chilling the walls enables a larger cooling contact patch with the cooling system, allowing faster depressurization when control is needed (such as in remote cooking modes, or when manual depressurization is not ideal).

In addition, while non-reversible cooling systems may be used in some embodiments, in other embodiments a vapor compression cooling system may also be operable in a reverse heat pump mode, and thus enable the cooling coil to be used alternatively to provide heating to the side wall(s) of a crock to maintain warmth, rather than trying to duty cycle the high wattage heating element used for cooking. It has been found, for example, that the high wattage heating elements typically used in pressure cookers, even when duty cycled, are much more likely to burn the bottom food layer, whereas a more gentle warmth around the perimeter of the crock may warm food with a lower risk of burning. Furthermore, in comparison to other types of cooling systems such as Peltier or thermoelectric cooling systems, the use of a cooling coil and a vapor compression cooling system as described herein reduces the generation of heat within the interior of a pressure cooker housing, greatly simplifying housing design and heat dissipation issues.

In some embodiments, the components illustrated in FIGS. 4-5 may be incorporated into housing 12, and may, in some embodiments, utilize one or more fans for heat exchange. The condenser may also be incorporated into the outer housing wall 16 in some embodiments. In other embodiments, however, at least some of the components may be disposed externally from housing 12, e.g., in a separate housing, and in some embodiments, may be removably coupled to the pressure cooker, with suitable ports utilized to fluidly couple the external components with the components internal to housing 12. In addition, such components may be provided in a removable unit that may be coupled to different appliances, e.g., a blender, a mixer, an ice cream maker, a microwave or other cooking appliance, etc., such that a single unit may be used to add cooling functionality to multiple compatible appliances.

In addition, the incorporation of cooling functionality into a pressure cooker as disclosed herein may enable additional operations to be performed using the same pressure cooker, e.g., a cooler operation where the crock functions as a cooler for keeping ice baths or other liquids cold, for chilling wine, for storing beverages at a party, for holding ice baths for cooking/blanching, for chilling gazpacho and other cold soups, etc. In addition, as discussed in greater detail below, through the addition of separate lids, additional functions, e.g., ice cream making, pellet ice production, mixing, blending, etc. may also be supported.

Figure 6:
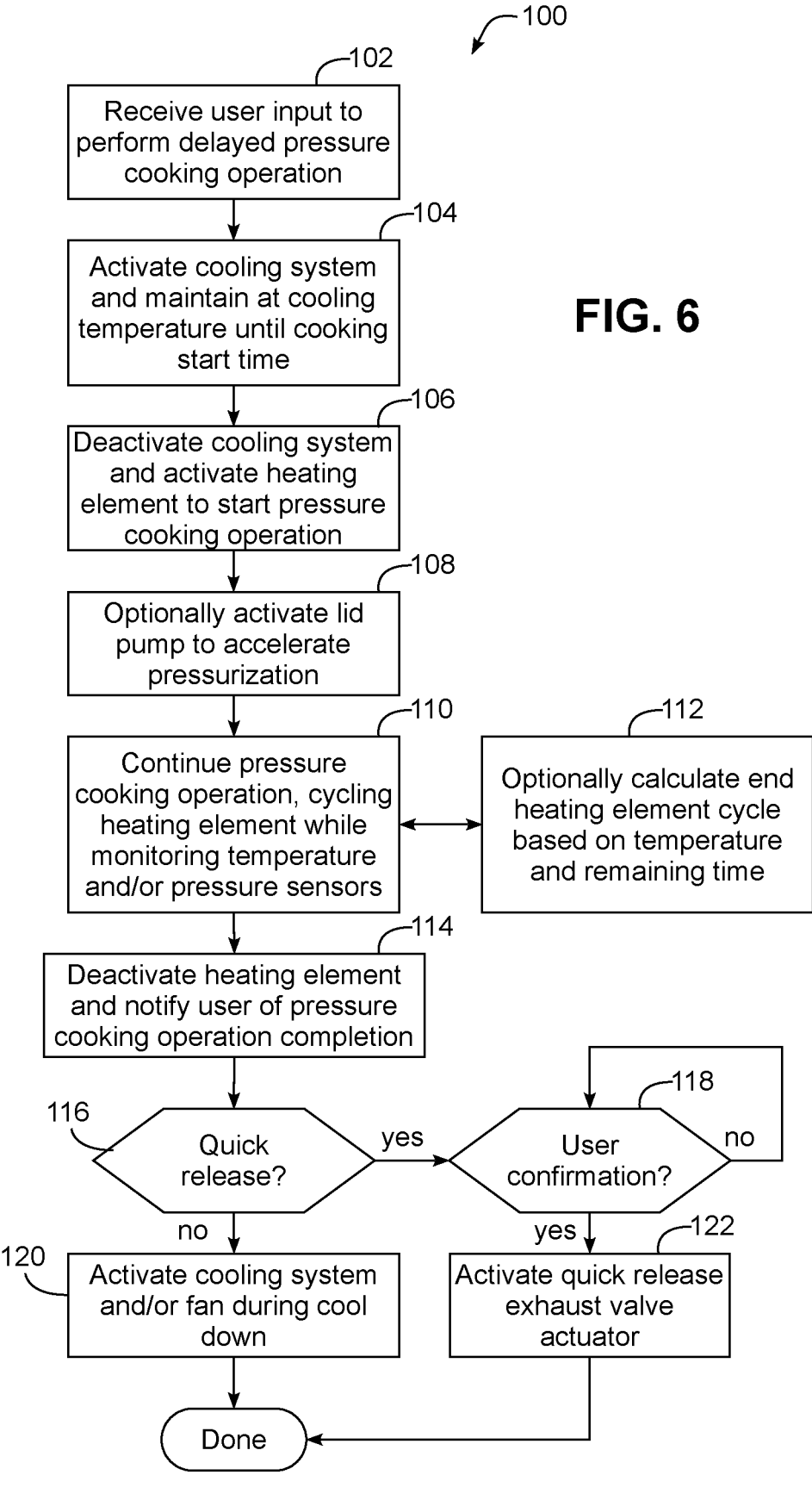
FIG. 6 is a flowchart illustrating an example operational sequence for performing a pressure cooking operation using the pressure cooker of FIGS. 1-3.

Now turning to FIG. 6, an example operational sequence 100 for performing a delayed pressure cooking operation with pressure cooker 10 is illustrated in greater detail. A delayed pressure cooking operation, for example, may include a delay portion, during which the pressure cooker is waiting to start, and optionally cooling the contents of the crock, a pressurization portion, where the pressure cooker preheats the crock and increases the pressure to a desired temperature and/or pressure, a cooking portion where a desired temperature and/or pressure are maintained for a desired duration, and a depressurization portion where the pressure cooker allows the temperature and pressure in the crock to decrease until such time the lid may be opened and the contents of the crock served or otherwise removed.

Assume, for example, that a user desires to perform a pressure cooking operation using frozen or cold raw food or other perishable foods, but to start the pressure cooking operation at a predetermined time or after a predetermined number of hours, or to complete at a predetermined time. Thus, for example, a user-selectable option may be provided such as "Dinner ready at 6 PM", and the pressure cooker may refrigerate the crock to keep food contents within a refrigeration temperature range (e.g., between about 32° F. and about 40° F.) until perhaps 5 PM, knowing there is a 1 hour cooking cycle, so the meal is finished at or near 6 PM. In some embodiments, the controller may also be configured to learn to adjust cooling/heating times as more cycles are run. Predetermined cycles may be established, for example, for Chicken, Roast, Pasta, etc.

As such, if a user wishes to have dinner ready at the end of a workday, in the morning the user may fill the crock 34 with the desired ingredients, secure lid 14, and configure the pressure cooker using, for example, user interface 18, a mobile app running on user device 76, a web app running on a browser in communication with remote service 74, etc. to complete a pressure cooking cycle at a predetermined time such as 6 PM. The user input is received in block 102, and in block 104, cooling system 42 is activated to refrigerate crock 34 and maintain a temperature in crock 34 at a suitable refrigeration temperature range (e.g., between about 32° F. and about 40° F.) until the user-selected start time has been reached.

At this time, cooling system 42 may be deactivated and heating element 36 may be activated to start the pressure cooking operation in block 106, which begins to heat crock 34 to begin pressurizing the crock. Then, in block 108, if an electrically-controllable lid pump 48 is provided on lid 14, the lid pump may optionally be activated to accelerate pressurization of the crock during the heating process, thereby reducing the overall cooking time.

Once the desired pressurization and/or temperature are reached (e.g., by sensing temperature and/or pressure using sensors 52, 54), the pressure cooking operation continues for the user-selected duration, during which heating element 36 is periodically cycled to maintain a desired temperature and/or pressure. It will be appreciated that, rather than sensing temperature from a sensor in the lid, a temperature sensor may also be mounted to housing 12, e.g., in inner wall 32. In addition, in some embodiments, a thermal spring may be incorporate to thermally connect a housing-mounted temperature sensor with crock 34.

In addition, as illustrated in block 112, it may also be desirable in some embodiments to optionally calculate an end heating element cycle based on the current temperature and the remaining time in the cycle. Conventional pressure cooker algorithms, for example, cycle a heating element using a fixed on/off cycle until the completion of a user-selected duration. As such, if a pressure cooking operation is within 1 minute of completion, but the sensed temperature falls below a predetermined threshold before completion, the heating element will generally be activated at full output for the predetermined cycle duration, resulting in the temperature in the crock rapidly increasing such that, once the completion time is reached, the temperature in the crock is at the highest possible state, and maximizing the time required to depressurize and cool down.

In some embodiments of the invention, however, controller 40 may be configured to detect when the completion point for the cooking portion of the pressure cooking operation is going to be reached, and if it is sufficiently close in time to the last heating element cycle, the last heating element cycle may be altered, or even skipped, in order to reduce the amount of heating that occurs at the end of the cooking portion of the pressure cooking operation. For example, the heating element cycle may be altered to shorten the duration of the heating element activation (e.g., 50% of the duration), to lower the heating element output (e.g., 50% of maximum output), or some combination thereof. By doing so, the temperature at the end of cycle may be configured to be proximate a lowest allowed state for the cooking portion, such that when the cooking portion is complete and the pressure cooking operation proceeds to the cooldown portion, the temperature and pressure within the crock lower than would otherwise have occurred, thereby accelerating depressurization and cooling.

Next, as illustrated at block 114, when the cooking portion of the pressure cooking operation is complete, heating element 36 is deactivated, and the user may be notified, e.g., via user interface 18 and/or an app, of the completion of the operation, then, based upon whether a quick depressurization or release is appropriate for the particular pressure cooking operation, block 116 passes control to either block 118 or block 120.

If a quick depressurization or release is specified, for example, block 118 optionally waits for user confirmation before activating quick release exhaust valve actuator 50 in block 122. User confirmation may be desired, for example, to ensure all individuals in the vicinity are clear of the exhaust valve prior to activation, although in other embodiments, no confirmation may be required. The user confirmation may be received via the user interface 18 or via a mobile app in some embodiments, and in embodiments where no quick release exhaust valve actuator is used, a user may manually release pressure in a conventional manner in some embodiments. Once depressurization has occurred, the pressure cooking operation is complete, and the user is permitted to remove lid 14 and serve or otherwise remove the cooked food in crock 34.

Returning to block 116, if no quick depressurization or release is specified or desired, the depressurization portion of the pressure cooking operation is initiated, whereby control passes to block 120 to allow natural depressurization and cooling to occur. However, during this time, it may also be desirable to activate cooling system 42 and/or housing fan 46 to accelerate this depressurization and cooling process, thereby shortening the depressurization portion as well as the overall pressure cooking operation. Once sufficient depressurization has occurred, the pressure cooking operation is complete, and the user is permitted to remove lid 14 and serve or otherwise remove the cooked food in crock 34.

As noted above, a vapor compression cooling system may be utilized for other types of operations, including chilling liquids, beverages, soups, etc., as well as for delaying other types of operations such as slow cooking, as well as other types of pressure cooking operations, e.g., specialized pressure cooking operations such as rice cooking operations. As another example, it may be desirable in some embodiments to utilize a vapor compression at the end of a cooking operation, to essentially refrigerate cooked food after the cooking operation is complete, e.g., enabling a consumer, for example, to cook a pot of soup in the morning and then refrigerate the soup rather than letting it sit for hours at or above room temperature before someone arrives home.

Thus, the invention is not limited to the particular pressure cooking operation disclosed herein.

Housing Fan

As noted above, it may also be desirable in some embodiments to incorporate a housing fan (e.g., housing fan 46 of pressure cooker 10) to direct airflow through at least a portion of the housing interior, and in some instances, within the outer chamber, between the inner housing wall the side wall(s) of the crock, in order to provide cooling to the side wall(s) of the crock, e.g., during a depressurization portion of a pressure cooking operation.

Such a fan may also be useful for other purposes, e.g., to collect smoke or steam generated by slow cooking, sautéing cooking, or other cooking operations performed with the pressure cooker where the lid is not secured to the housing and the crock is not pressurized during the operation. These various cooking operations may collectively be referred to hereinafter as non-pressurized cooking operations.

In some embodiments, a housing fan may be configured to draw air from an external vent proximate a top of the pressure cooker, direct the air downwardly through one or more air channels in the housing, and then exhaust the air through another external vent, thereby providing a generally downward flow of air. By doing so, the air that is heated by the crock is exhausted proximate the bottom of the pressure cooker, and farther away from the user. Such downward airflow may also be more efficient in some embodiments when cooling the crock as cooler air will be circulated along the side wall(s) of the crock prior to passing by the relatively hot heating element proximate the bottom of the crock. Moreover, as noted above, such downward airflow may be useful for drawing in steam or smoke generated during slow cooking or sautéing operations.

In addition, in some embodiments, at least a portion of the airflow generated by a housing fan may be directed within one or more air channels defined within the outer chamber, and between the side wall(s) of the crock and the side wall(s) of the inner wall of the housing. Such airflow may also be more efficient for cooling purposes as the airflow in greater direct contact with the side wall(s) of the crock.

Moreover, it may also be desirable in some embodiments to utilize a reversible housing fan capable of selectively providing downward or upward airflow for different purposes. For example, in some embodiments, downward airflow may be more efficient for cooling, as well as for drawing in smoke or steam generated during slow cooking or sautéing, while upward airflow may be used in some embodiments to accelerate pressurization during a pressurization portion of a pressure cooking operation by drawing air across the heating element and upwards to heat the side wall(s) of the crock, particularly during delay pressure cooking operations where the cooling coil of a vapor compression cooling system has been refrigerating the crock immediately prior to the pressurization portion of the delay pressure cooking operation.

Figure 7:
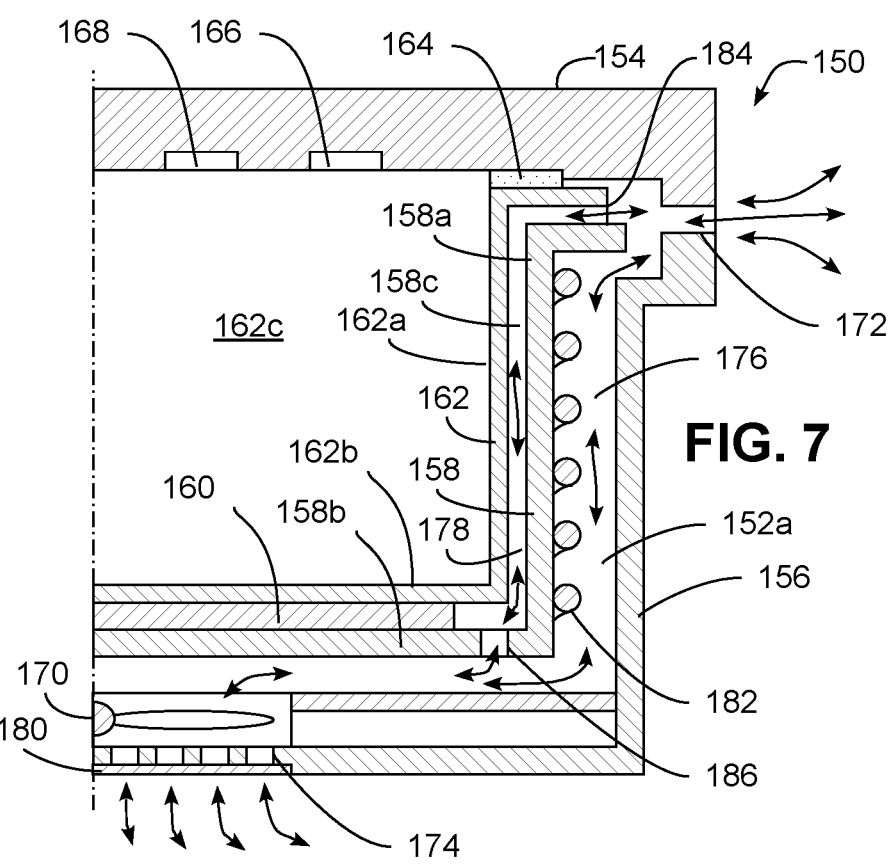
FIG. 7 is a partial cross-sectional view of an example pressure cooker consistent with some embodiments of the invention.

FIG. 7, for example, illustrates a pressure cooker 150 that includes a housing 152 and lid 154. Housing 152 includes an outer housing wall 156 and an inner housing wall 158 defining an interior 152a of housing 152, with inner housing wall including a side wall 158a and a bottom wall 158b, and forming an outer chamber 158c. A heating element 160 is disposed within outer chamber 158c proximate bottom wall 158b, and a crock 162, including a side wall 162a and a bottom wall 162b, and defining a cooking chamber 162c, supported within outer chamber 158c. Bottom wall 162b is positioned opposite, and in some instances, in contact with heating element 160.

Lid 154 is removably secured to housing 152 and is configured to seal cooking chamber 162c, e.g., with a seal 164. Additional components, e.g., a temperature and pressure sensor 166, 168, may also be disposed in lid 154 and exposed to cooking chamber 162c to sense the temperature and/or pressure in the cooking chamber.

In addition, pressure cooker 150 includes a housing fan 170, one or more upper external vents 172 disposed proximate a top of housing 12, and one or more lower external vents 174 disposed proximate a bottom of housing 12. Furthermore, one or more air channels, e.g., air channels 176, 178 are disposed between and in fluid communication with external vents 172, 174 and with housing fan 170, such that activation of housing fan 170 draws air in one of external vents 172, 174 through air channels 176, 178, and exhausts the air through the other of external vents 172, 174.

In some embodiments, one or more filters may be utilized in connection with a housing fan in order to filter air being circulated through air channels 176, 178, e.g., filter 180 illustrated proximate external vent 174. Multiple filters may be used in some embodiments, and a filter may be disposed anywhere within the airflow generated by housing fan 170. A filter may also be removable and cleanable in some embodiments. In addition, in some embodiments, it may be desirable to provide one or more unidirectional flap gates that prevent heated airflow during heating, but that also allow airflow when the housing fan is activated, with the airflow generated by the housing fan pushing the gates open and allowing cooling air in.

In some embodiments, housing fan 170 may be reversible, as represented by the double-headed arrows in FIG. 7. It may be desirable, for example, to generate an upward flow (from external vent 174 to external vent 172) in order to heat the side wall(s) 158a of interior housing wall 158 and side wall(s)) 162a of crock 162, particular, if as illustrated in FIG. 7, a cooling coil 182 is incorporated in pressure cooker 150, e.g., to heat up the side wall(s) at the start of a pressurization portion of a delay pressure cooking operation to accelerate pressurization, as the upward airflow carries air past heating element 160 such that heated air passes across cooling coil 182 as well as side wall(s) 158a, 162a. Conversely, it may be desirable to generate downward flow (from external vent 172 to external vent 174) in order to cool side wall(s) 158a, 162a during a depressurization portion of a pressure cooking operation to accelerate depressurization, as the downward airflow carries ambient air drawn in from external vent 172 past side wall(s) 158a, 162a before it encounters heating element 160. Another benefit of such a downward airflow is that hot air is exhausted from the bottom of the pressure cooker, rather than near the top where a user may be interacting with the pressure cooker.

Figure 8:
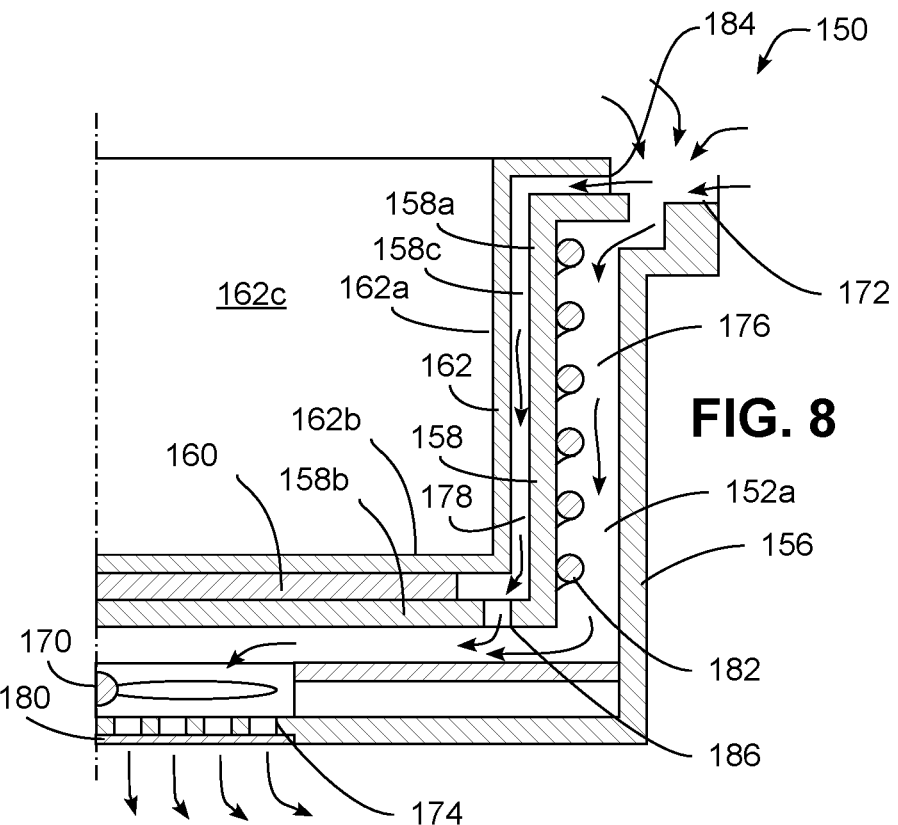
FIG. 8 is a partial cross-sectional view of the pressure cooker of FIG. 7, operating in a non-pressurized cooking mode.

In addition, as illustrated in FIG. 8, for some cooking operations, e.g., non-pressurized cooking operations where lid 154 may be removed or where cooking chamber 162c is otherwise not pressurized and sealed, the cooking operation may generate smoke and/or steam, and housing fan 170 may be used to draw the smoke and/or steam-filled air into external vent 172, and when a filter 180 is present, filter the air prior to exhausting it from external vent 174. It also may be desirable in such embodiments to include a drain and/or collector in housing 152 to collect any moisture drawn in by housing fan 170.

It will be appreciated that different numbers, configurations and/or locations of external vents 172, 174 may be used in other embodiments. For example, external vent 172 is illustrated as being defined in part by the gap between housing 152 and lid 154, although the invention is not so limited, and external vent 172 may be defined fully in housing 152 in some embodiments, or venting may be performed at least partially through vents in lid 154. External vent 174 may also be positioned in different locations, e.g., closer to the perimeter of housing 152. Various internal passageways may also be defined within housing 12, e.g., as illustrated at 184 and 186, particularly when an air channel is defined within outer chamber 158c, and it will further be appreciated that housing fan 170 may also be disposed in different locations within housing 152.

In addition, as noted above, housing fan 170 in some embodiments may only support one direction of flow (e.g., downward only or upward only). Further, in some embodiments, air channels may only be defined within outer chamber 158c, or only defined within interior 152a of housing 152. It will be appreciated, however, that for the purposes of heating or cooling crock 162, airflow within outer chamber 158c may provide more direct contact with crock 162, and thus greater heating/cooling efficiency in some embodiments.

Figure 9:
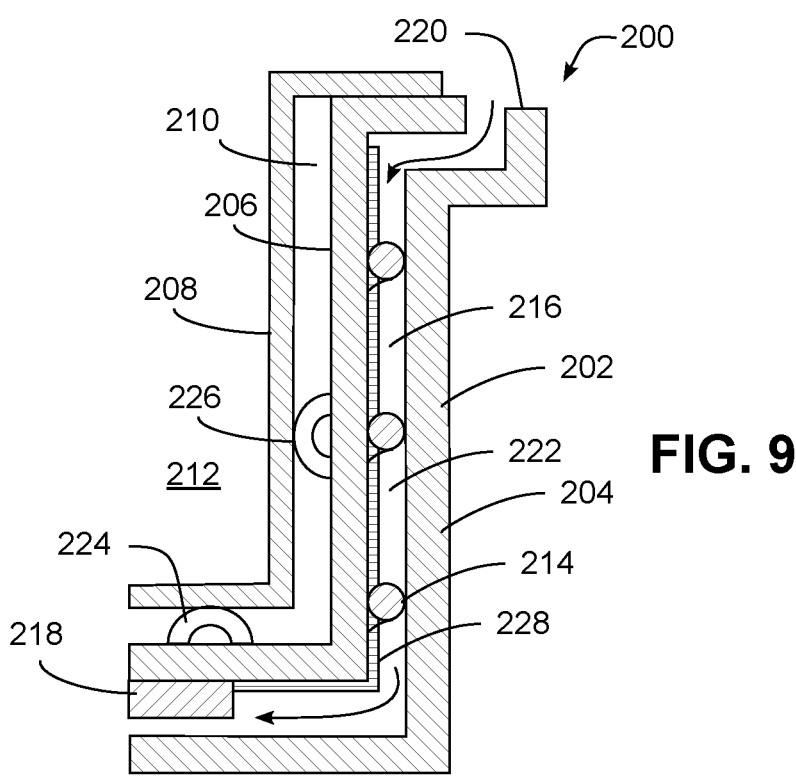
FIG. 9 is a partial cross-sectional view of another example pressure cooker consistent with some embodiments of the invention.

FIG. 9 illustrates a number of additional features that may be utilized in some embodiments. In particular, a pressure cooker 200 includes a housing 202 with an outer housing wall 204 and inner housing wall 206 and a crock 208. An outer chamber 210 is defined between inner housing wall 206 and crock 208, and a cooking chamber 212 is defined within crock 208. A helically-wound cooling coil 214 of a cooling system is disposed in an interior 216 of housing 202, between outer housing wall 204 and inner housing wall 206, and a heating element 218 is disposed below crock 208 and inner housing wall 206.

In this embodiment, interior 216 is dimensioned such that cooling coil 214 substantially spans the distance between outer housing wall 204 and inner housing wall 206. If airflow is desired, then the spaces between the coil segments of cooling coil 214 may be used to define a helical air channel 222, such that air may be drawn in through one or more upper external vents 220 into the helical air channel 222, circle the crock 208 and chambers 210, 212, and then be exhausted through a lower external vent (not shown in FIG. 9) by a fan (also not shown in FIG. 9).

In this embodiment, no air circulation is utilized in outer chamber 210. Instead, one or more thermal springs, e.g., thermal springs 224, 226, may be used to conduct heat between the side and/or bottom walls of inner housing wall 206 and crock 208. In addition, in some embodiments, one or more heat pipes 228 may be coupled to inner housing wall 206 and to heating element 218 to conduct heat from heating element 218 to the side wall(s) of inner housing wall 206. Such structures may be utilized, for example, to accelerate heating and/or cooling within cooking chamber 212, and it will be appreciated that different numbers and/or configurations of thermal springs, heat pipes, and other heat conveying structures may be used in other embodiments.

Other manners of introducing airflow within the housing of a pressure cooker to accelerate heating and/or cooling may be used in other embodiments, so the invention is not limited to the specific implementations discussed herein.

Reduced Volume Crock

It may also be desirable in some embodiments to support the use of a reduced volume crock in a pressure cooker. In particular, it will be appreciated that many pressure cooker designs are driven by a desire to support relatively large crocks capable of cooking meals suitable for feeding an entire family, and may utilize crocks that are 6, 8 or even 12 quarts in volume. For smaller meals, however, such crocks can be inefficient, as the larger the volume in a crock, the longer it takes to pressurize and reach a suitable cooking temperature.

Conventional pressure cookers incorporate a single crock that is sized to be supported within the housing with its top lip or rim sealed against the lid by a seal on the lid, and with the bottom of the crock positioned on or in close proximity to a heating element. Reducing the size or volume of such a crock, particularly by shortening the height of the crock, however, would either result in a crock that was spaced too far from the lid to form an effective seal, or that was spaced too far from the heating element to efficiently heat and pressurize the crock.

Some embodiments consistent with the invention, on the other hand, may include various improvements to a pressure cooker to incorporate a reduced volume crock, thereby enabling faster heating and pressurization of the smaller volume within the cooking chamber (as well as faster cooling and depressurization), and thus more efficient cooking overall. Such improvements, however, do not foreclose the use of a regular volume crock in the same pressure cooker, thereby providing greater consumer flexibility for cooking different types of meals. In addition, as will become more apparent below, a reduced volume crock in some embodiments may be retrofitted into an existing pressure cooker designed for larger volume crocks without any modifications being required for the pressure cooker. It may also be desirable to support multiple reduced volume crock sizes, e.g., ¼, ⅓ and/or ½ sized crocks in some embodiments, where a ½ sized crock would represent a cooking chamber having approximately one half the volume of the cooking chamber of a full volume crock used a particular pressure cooker.

A reduced volume crock, in this regard, may be considered to refer to a crock that, when used with a particular pressure cooker, has a cooking chamber with a size or volume that is not sufficient to both form an adequate seal with the lid, and be efficiently heated by a heating element disposed proximate the bottom of the outer chamber of the pressure cooker. Where a reduced volume crock is designed to incorporate an upper lip or rim that is supported from an upper lip or rim of a pressure cooker housing, this generally results in a bottom wall of the reduced volume crock being physically spaced or separated from the bottom of the outer chamber (e.g., as defined by an inner housing wall) a sufficient distance to inhibit efficient heating of the crock during a pressure cooking operation.

Figure 10:
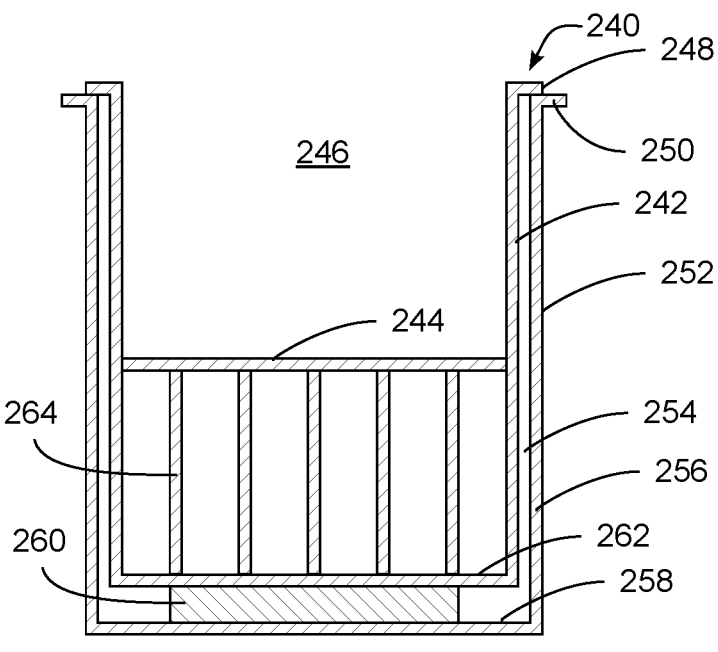
FIG. 10 is a cross-sectional view of a false-bottom reduced volume crock and outer chamber of a pressure cooker consistent with some embodiments of the invention.
Figure 11:
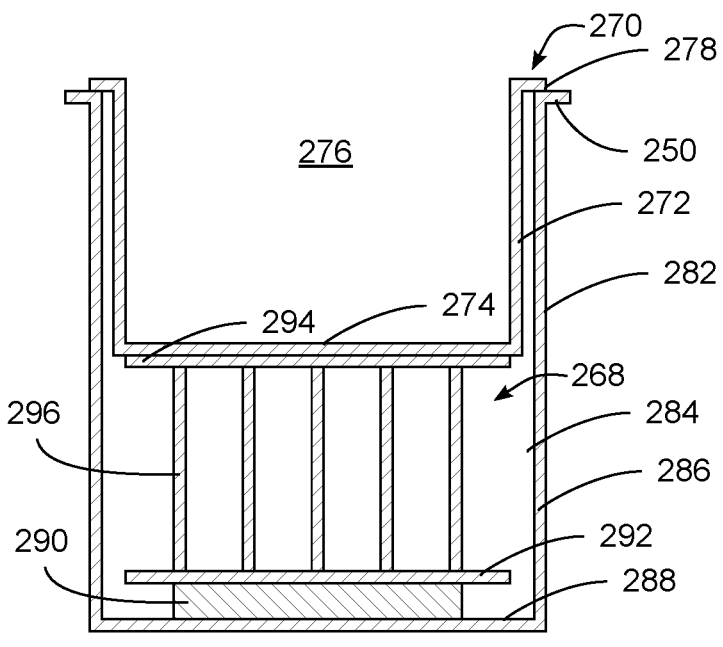
FIG. 11 is a cross-sectional view of a reduced volume crock and outer chamber of a pressure cooker consistent with some embodiments of the invention, and including a separate thermally-conductive body supporting the reduced volume crock.

As illustrated in FIGS. 10 and 11, for example, support for a reduced volume crock in some embodiments may rely on the use of a thermally-conductive body interposed between a bottom wall of the reduced volume crock and the heating element and/or bottom of the outer chamber of a pressure cooker. FIG. 10, in particular, illustrates a "false bottom" reduced volume crock 240 that includes one or more side walls 242 and a bottom wall 244 that define a cooking chamber 246, along with a lip or rim 248 capable of supporting the reduced volume crock 240 on a lip or rim 250 of an inner housing wall 252 of a pressure cooker that defines an outer chamber 254. Inner housing wall includes one or more side walls 256 and a bottom wall 258, and a heating element 260 is disposed proximate bottom wall 258.

In this implementation, bottom wall 244 is a "false" bottom wall, and side wall(s) 242 of reduced volume crock 240 extend below the elevation of bottom wall 244 to contact or join with a supporting bottom wall 262 that contacts or is at least in close proximity to heating element 260, and a plurality of thermal conductors, e.g., conductive fins 264 extend between supporting bottom wall 262 and false bottom wall 244 to conduct heat generated by heating element 260 up to false bottom wall 244, and thereby enable heating element 260 to sufficiently and efficiently supply heat to cooking chamber 246. It will be appreciated that a wide variety of thermal conductor designs may be utilized to distribute heat generated by heating element 260 across the surface area of false bottom wall 244. In addition, in some embodiments, one or more of conductive fins 264 may be implemented as heat pipes. As such, the extended portions of side walls 242, supporting bottom wall 262 and conductive fins 264 effectively form a thermally-conductive body that is mounted to or otherwise integrated with reduced volume crock 240.

In contrast, FIG. 11 illustrates a thermally-conductive body 268 that is independent of a reduced volume crock 270. Reduced volume crock 270 includes one or more side walls 272 and a bottom wall 274 that define a cooking chamber 276, along with a lip or rim 278 capable of supporting the reduced volume crock 270 on a lip or rim 280 of an inner housing wall 282 of a pressure cooker that defines an outer chamber 284. Inner housing wall includes one or more side walls 286 and a bottom wall 288, and a heating element 290 is disposed proximate bottom wall 288.

In this implementation, thermally-conductive body 268 includes a supporting bottom plate 292 that contacts or is at least in close proximity to heating element 290, a supporting top plate 294 that contacts or is at least in close proximity to bottom wall 274 of reduced volume crock 270, and a plurality of thermal conductors, e.g., conductive fins 296 that extend between supporting bottom plate 292 and supporting top plate 294 to conduct heat generated by heating element 290 up to bottom wall 274 of reduced volume crock 270, and thereby enable heating element 290 to sufficiently and efficiently supply heat to cooking chamber 276. It will be appreciated that a wide variety of thermal conductor designs may be utilized to distribute heat generated by heating element 290 across the surface area of bottom wall 274. In some embodiments, thermally-conductive body 268 may be mounted in a removable manner to reduced volume crock 270 (e.g., using a twist and lock coupling, or in other suitable manners), while in other embodiments, thermally-conductive body 268 may be completely independent and may only be positioned in the space between heating element 290 and bottom wall 274 of reduced volume crock 270.

Regardless of whether a thermally-conductive body is integrated into, mounted to, removably coupled to, or even independent of a reduced volume crock, it will be appreciated that such a design may be suitable for allowing a reduced volume crock to be used in a pressure cooker designed for larger volume crocks. Moreover, it may be desirable in some embodiments to allow for multiple crock volumes to be supported, and thereby allow a consumer to select the crock having the most appropriate size for the meal being prepared, while improving the efficiency of the pressure cooking operation due to the ability to more quickly and efficiently pressurize the reduced volume crock.

Figure 12:
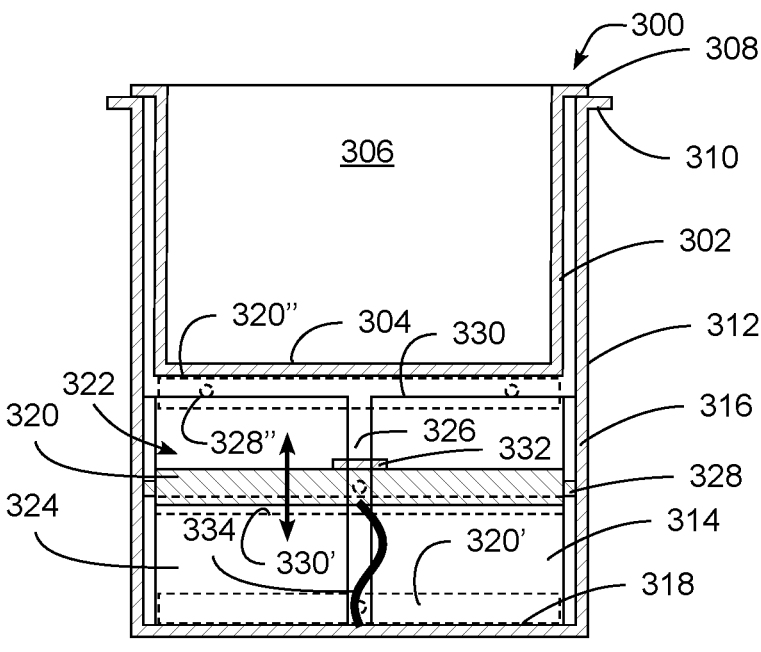
FIG. 12 is a cross-sectional view of a reduced volume crock and outer chamber of a pressure cooker consistent with some embodiments of the invention, and including a selectively-elevated heating element.
Figure 13:
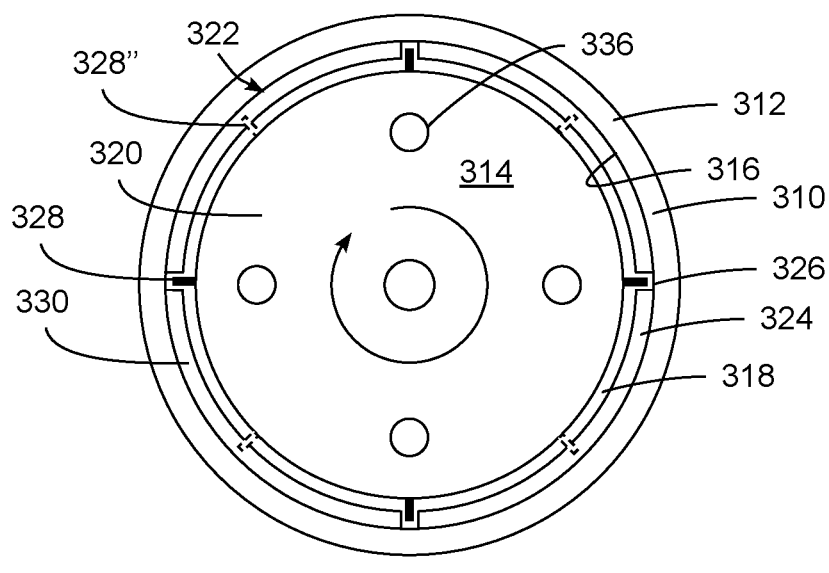
FIG. 13 is a top plan view of the outer chamber and heating element of FIG. 12, with the reduced volume crock removed.
Figure 14:
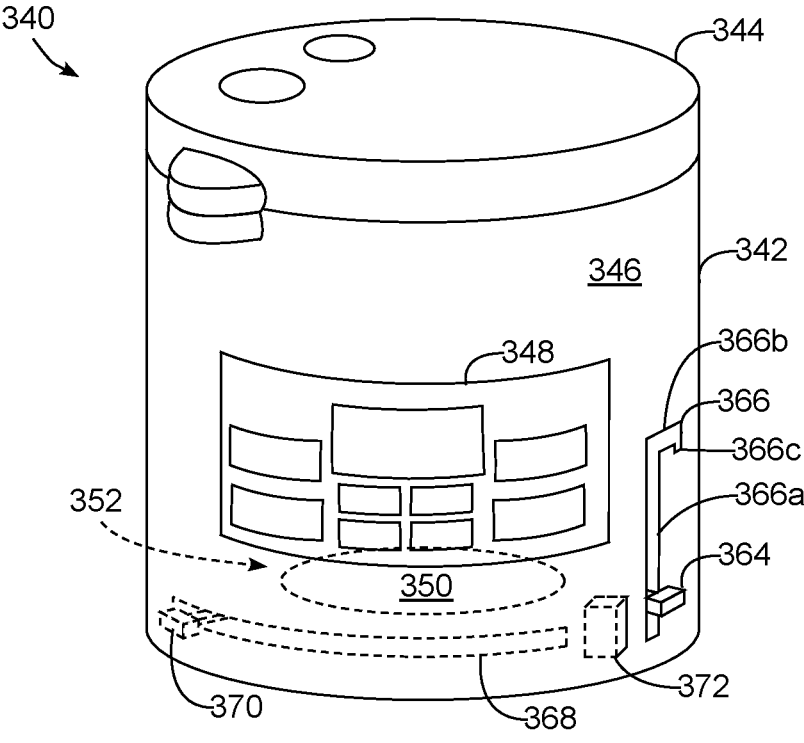
FIG. 14 is a front perspective view of another pressure cooker consistent with some embodiments of the invention, and including an externally-accessible handle for selectively elevating a heating element.

Now turning to FIGS. 12-14, another manner of accommodating a reduced volume crock in some embodiments is to utilize a selectively-elevated heating element in a pressure cooker to enable the heating element to be selectively raised or lowered within the outer chamber of the pressure cooker to position the heating element at an appropriate elevation for the particular crock used in a pressure cooking operation.

FIGS. 12-13, for example, illustrate an example embodiment of a reduced volume crock 300 that includes one or more side walls 302 and a bottom wall 304 that define a cooking chamber 306, along with a lip or rim 308 capable of supporting the reduced volume crock 300 on a lip or rim 310 of an inner housing wall 312 of a pressure cooker that defines an outer chamber 314. Inner housing wall includes one or more side walls 316 and a bottom wall 318.

A heating element 320 is ordinarily disposed proximate bottom wall 318 when a regular volume crock is supported in the outer chamber. However, rather than being fixedly mounted in this position, heating element 320 is movable within outer chamber 314. A heating element support 322 is configured to selectively elevate heating element 320 within outer chamber 314 to position heating element 320 opposite bottom wall 304 of reduced volume crock 300 to supply heat to the reduced volume crock during a pressure cooking operation. In this embodiment, the heating element support 322 includes multiple (e.g., four) columns 324 that project inwardly from side wall 316 of inner housing wall 312, and that are separated by slots 326 through which multiple (e.g. four) pins 328 mounted to heating element 320 are allowed to slide when moving between an unelevated position (represented at 320') and an elevated position (represented at 320"). Moreover, when at the elevated position, heating element 320 may be rotated about a substantially vertical axis (e.g., about 45 degrees) to unalign pins 328 with slots 326 (e.g., to the position illustrated at 328"), such that pins 328 support heating element 320 on the top surfaces 330 of columns 324.

It may also be desirable to incorporate a crock sensor 332 onto heating element 330 to enable a controller to confirm whether heating element 320 is disposed at an appropriate elevation for a crock being used for a pressure cooking operation before allowing the operation to begin, and in some instances, signal an error if a crock is not detected. In addition, a cable 334 or other movable electrical connection may also be used to provide electrical power to the heating element at different elevations.

In the illustrated embodiment of FIGS. 12-13, heating element 320 is manually movable between different elevations, e.g., using holes 336 (FIG. 13) formed in heating element 320 to provide a grip for manually raising, lowering and twisting the heating element. In other embodiments, however, it may be desirable to provide a manual or automated lifting mechanism to selectively elevate heating element 320. FIG. 14, for example, illustrates a pressure cooker 340 including a housing 342, lid 344, outer housing wall 346 and user interface 346, similar to pressure cooker 10 of FIGS. 1-3. In addition, pressure cooker 340 may include a heating element 350 and a heating element support 352 similar to heating element 320 and heating element support 322 of FIGS. 12-13. Rather than having to reach into an outer chamber and manually lift the heating element, however, heating element support 352 of pressure cooker 340 further includes a lever 364 that projects through a slot 366 in outer housing wall 346 and couples to heating element 350 to enable a user to selectively elevate the heating element without having to reach inside of the pressure cooker. Slot 366 may be configured with a vertical portion 366a that allows the pins to slide within the slots in the outer chamber, as well as a horizontal portion 366b that allows for rotation of the heating element about a substantially vertical axis, and a catch 366c that maintains the rotational position of the heating element to maintain the heating element in the elevated position.

It will be appreciated, however, that other mechanisms may be used to raise and lower the heating element in other embodiments. As represented at 368, for example, it may be desirable to use a rotatable cam system 368 to selectively lift the heating element in response to rotational movement of an arm 370 about a substantially vertical axis. As another example, and as represented by linear actuator 372, it may be desirable to use an automated electromechanical lift mechanism, such as a linear actuator, drive motor, etc., to raise and lower the heating element, e.g., under the control of a controller or user interface control. Implementation of these variations, as well as additional variations that may be used to selectively elevate a heating element to different elevations, will be apparent to those of ordinary skill having the benefit of the instant disclosure.

It will also be appreciated that a pressure cooker may support more than two elevations for a heating element, thereby supporting more than two crock volumes with a single pressure cooker design, e.g., as represented by intermediate horizontal slot 330' in FIG. 12. Moreover, a horizontal slot may also be provided at the unelevated position so that the heating element may be locked in the unelevated position until the heating element is twisted to align the pins with the slot.

In addition, in some embodiments, a heating element support may bias the heating element to an elevated position, requiring a force and locking mechanism to maintain the heating element in a lowered position, or alternatively the insertion of a full volume or even reduced volume crock may be sufficient to force the heating element down while maintaining contact with the bottom of the crock.

Figure 15:
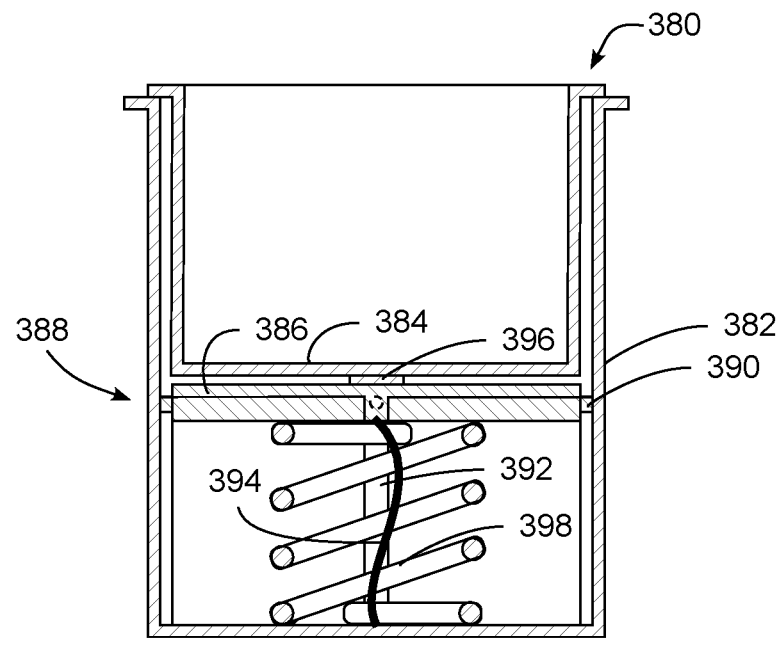
FIG. 15 is a cross-sectional view of a reduced volume crock and outer chamber of a pressure cooker consistent with some embodiments of the invention, and including a biased selectively-elevated heating element.

FIG. 15, for example, illustrates an example reduced volume crock 380 supported within an outer chamber 382, and having a bottom wall 384 in contact with a heating element 386. A heating element support 388, similar to heating element support 322 of FIGS. 12-13, may be used allow heating element 386 to move along a substantially vertical direction, e.g., including pins 390 sliding in slots 392. A power cable 394 provides power to heating element 386, and a crock sensor 396 senses crock 380. Unlike heating element support 322, however, heating element support 388 also includes a bias mechanism 398, e.g., a spring, that biases heating element 386 to an elevated position. Insertion of a crock having a depth that exceeds the biased elevation of heating element 386 will therefrom force heating element 386 in a downward direction, with the bias of bias mechanism 398 maintaining contact between crock 380 and heating element 386.

Other types of bias mechanisms and support structures that allow for constrained vertical movement of a heating element may be used in other embodiments. Therefore the invention is not limited to the particular embodiments discussed herein.

Lid Pump

It may also be desirable in some embodiments to incorporate a pump into a lid of a pressure cooker to accelerate pressurization and/or depressurization of a crock during a pressure cooking operation. It will be appreciated, for example, that the volume within a cooking chamber, even when a full sized crock is used, is relatively small, so even a relatively small increase in pressure in a cooking chamber can accelerate sealing and pressurization of the cooking chamber in many instances. a lid-mounted pump in different embodiments may be an electrically-powered, or electromechanical pump, or in some embodiments, may be a manually actuated pump such as a bulb pump. In addition, in some embodiments, a pump may be removably coupled to a pressure cooker lid such that the pump is not always attached to the lid. In such circumstances, a pump port may be provided in the lid, and in fluid communication with a cooking chamber through a one way valve, such that a user may insert the pump into the pump port to pressurize the cooking chamber during an appropriate point in a pressure cooking operation.

Figure 16:
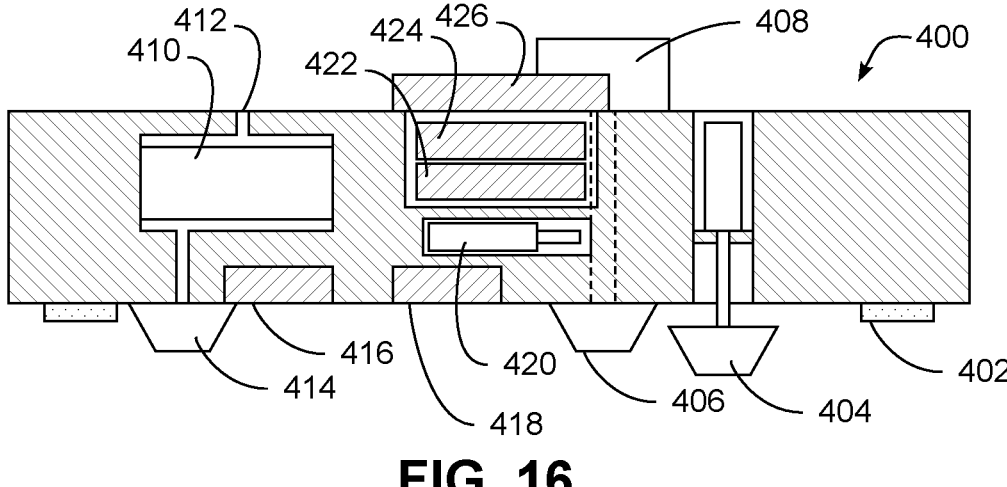
FIG. 16 is a cross-sectional view of a lid of a pressure cooker consistent with some embodiments of the invention, and including an electric pump.

FIG. 16, for example, illustrates an example lid 400 including a seal 402, a float valve 404 and a quick release exhaust valve 406 that is manually actuatable by a user via a handle 408. In addition, lid 400 includes an electromechanical pump 410 in fluid communication with the ambient environment via an inlet 412 and in fluid communication with a cooking chamber via a one way valve 414. In some embodiments, pump 410 may operate only in one direction, to pressurize a cooking chamber (e.g., during a pressurization portion of the pressure cooking operation), or alternatively, to depressurize a cooking chamber (e.g., during a depressurization portion of the pressure cooking operation). In other embodiments, the pump may be reversible and capable of selectively pressurizing or depressurizing a cooking chamber as desired.

In addition, as noted above, a lid such as lid 400 may also include one or both of a temperature sensor 416 and a pressure sensor 418. In addition, it may be desirable in some embodiments to incorporate an exhaust valve actuator 420 in lid 400 to provide an automated manner of actuating quick release exhaust valve 408 to quickly depressurize a cooking chamber.

In addition, lid 400 in the illustrated embodiment is in communication with a pressure cooker controller (not shown in FIG. 16) via a wireless adapter, which in the illustrated implementation is integrated into a lid controller 422 that also operates to interface the pressure cooker controller with the various electromechanical components and sensors on lid 400. In other embodiments, however, no separate lid controller may be used, and in some embodiments, a wireless adapter may be separate from a lid controller. Power to the lid is provided by a battery 424, which may be rechargeable in some embodiments, or alternatively may be replaceable, and accessed through a panel 426.

Figure 17:
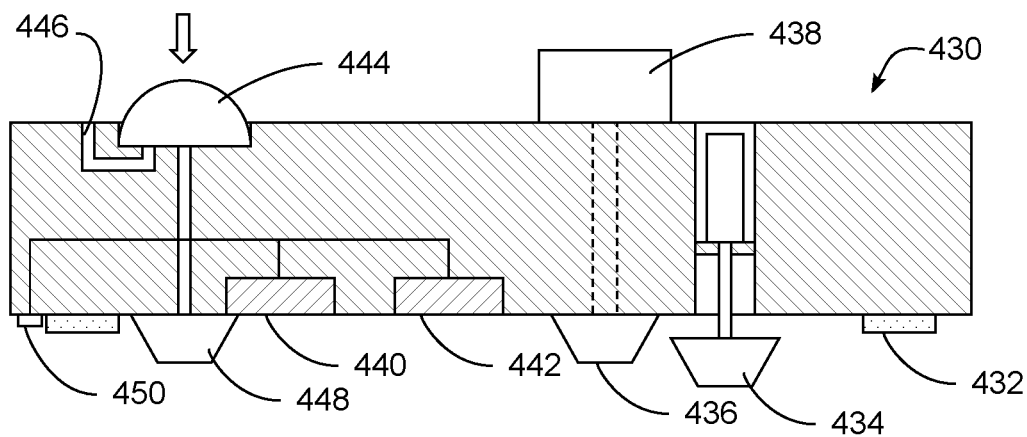
FIG. 17 is a cross-sectional view of a lid of a pressure cooker consistent with some embodiments of the invention, and including a manual pump.

FIG. 17 illustrates another lid 430 incorporating a number of different features from lid 400. Similar to lid 400, lid 430 includes a seal 432, a float valve 434, a quick release exhaust valve 436 and handle 438, a temperature sensor 440 and a pressure sensor 442. However, rather than utilizing an electromechanical pump, lid 430 incorporates a manual pump 444, which is in fluid communication with the ambient environment via an inlet 446 and with the cooking chamber via a one way valve 448, and is permanently mounted to the lid. Pump 444 in some embodiments may be a bulb pump, although other manual pump designs may be used in other embodiments. It also may be desirable to incorporate into the pressure cooker controller an alert function (e.g., via sounds, lights, or a message on a display or app) to alert a user as to a proper time during a pressure cooking operation to activate the pump.

Lid 430 also differs from lid 400 in that, rather than utilizing wireless communication, one or more pairs of cooperative electrical contacts, e.g., electrical contacts 450, are provided to engage when the lid is secured to the housing. The contacts may provide power and/or data communication, e.g., to communicate sensor outputs from sensors 440, 442, or to control an electromechanical pump and/or exhaust valve actuator for any lids incorporating such components. In other embodiments, contacts may only provide power, and data communication may still be performed using wireless adapters.

Figure 18:
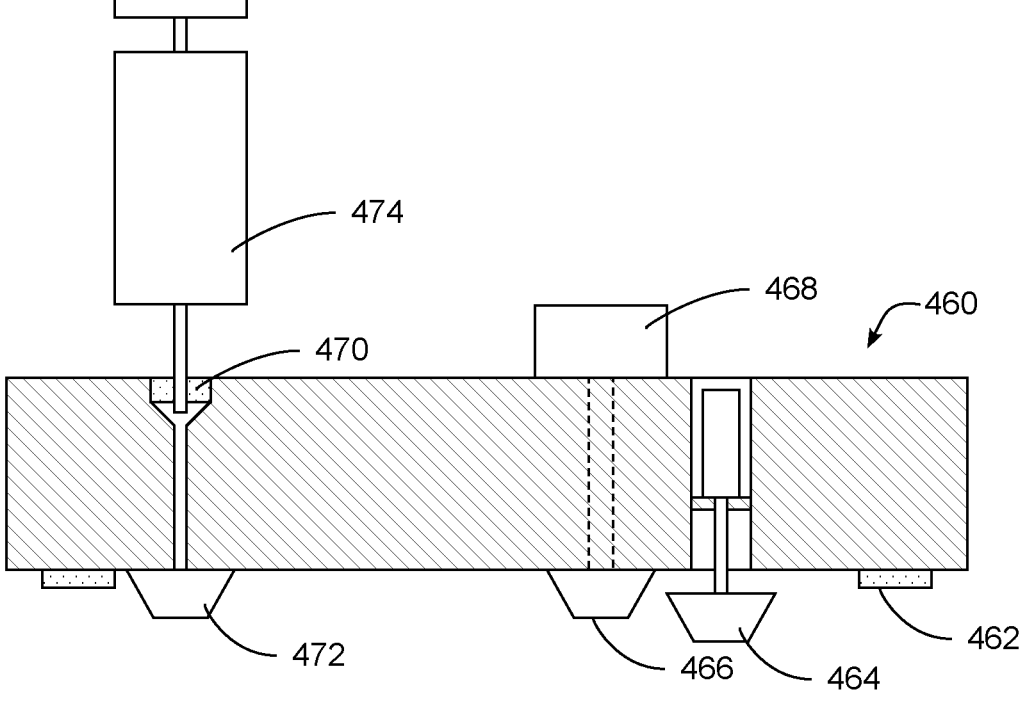
FIG. 18 is a cross-sectional view of a lid of a pressure cooker consistent with some embodiments of the invention, and including a port for receiving a removable pump.

Now turning to FIG. 18, another example lid 460 is illustrated. Similar to lid 430, lid 460 includes a seal 462, a float valve 464, and a quick release exhaust valve 466 and handle 468. However, rather than having a permanently mounted pump, lid 460 includes a pump port 470 that is in fluid communication with the cooking chamber through a one way valve 472, and that is configured to removably couple with a pump 474. Lid 460 also includes no electrically-actuated components, and as such, requires no power, although it should be appreciated that any of the aforementioned lid components may be integrated into lid 430 if desired. Pump 474 may be implemented using various types of pumps, including both manual pumps (e.g., bulb or piston pumps) or electromechanical pumps (e.g., a battery-powered pump). In addition, various valves, seals, etc. suitable for protecting port 470 when not in use, as well as forming an appropriate seal when pump 474 is coupled thereto, may be used, and will be appreciated by those of ordinary skill having the benefit of the instant disclosure.

Through the use of a removable pump, the pump may be stored away when not needed, and then brought out whenever it is desirable to use. As with lid 430, a controller of the pressure cooker may be configured in some embodiments to incorporate an alert function to alert a user as to a proper time during a pressure cooking operation to use the pump. Other variations will be apparent to those of ordinary skill having the benefit of the instant disclosure.

Specialty Lids

Now turning to FIG. 19, it will be appreciated that, particularly when cooling functionality is incorporated into a pressure cooker, various types of specialty lids may be envisioned to expand the functionality of a pressure cooker to handle additional types of cooking and non-cooking operations.

A specialty lid, within the context of a pressure cooker, may be considered to be a type of lid that, when secured to a pressure cooker, expands the functionality of the pressure cooker to handle one or more operations other than a pressure cooking operation. In many embodiments, a specialty lid may include one or more electromechanically-actuated components that are configured to project into a crock when the specialty lid is secured to the housing, and to facilitate performance of a specialty operation, e.g. various combinations of pumps, motors, valves, blades, arms, fans, switches, etc.

FIG. 19, for example, illustrates an example pressure cooker 500 including a housing 502 and user interface 504, and illustrated with a pressure cooker lid 506 removably secured thereto, with the capability of sealing a cooking chamber 508 disposed within an outer chamber 510 during a pressure cooking operation.

In addition, FIG. 19 illustrates two example specialty lids 512, 514 that may be utilized with pressure cooker 500 in place of lid 506. Specialty lid 512 in the illustrated embodiment is a blender lid with a blender blade 516 driven by a motor 518 for performing blending operations, while specialty lid 514 is an ice cream maker lid or a mixer lid with a mixer arm 520 driven by a motor 522 for performing ice cream making or mixing operations. It will be appreciated that the controller of pressure cooker 500 may control each of these specialty lids when connected, e.g., through cooperative electrical contacts or via cooperative wireless adapters (as discussed above), and moreover, control over the specialty lids, and performance of the specialty operations supported thereby, may be managed through user interface 504. Moreover, in some embodiments, each specialty lid may provide the controller with identifying information to enable the controller with the type of lid currently coupled to the pressure cooker, such that the controller may operate the pressure cooker accordingly.

Each of the aforementioned lids may be used in connection with a cooling system in some embodiments, e.g., for ice cream making, smoothie making, milkshake making, etc., although it will be appreciated that a specialty lid may be operable without any heating or cooling in some embodiments. The illustrated specialty lids are merely examples of possible types of specialty lids, and it will be appreciated that a pressure cooker consistent with the invention may interface with a multitude of other types of specialty lids to perform any number of different types of specialty operations. Therefore, the invention is not limited to the specific specialty lids discussed herein.

CONCLUSION

It will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. A pressure cooker, comprising:
a housing including an outer chamber;
a crock supported within the outer chamber of the housing, the crock including at least one side wall and a bottom wall defining a cooking chamber;
a lid removably secured to the housing and configured to seal the cooking chamber;
a heating element coupled to the housing and positioned opposite the bottom wall of the crock to heat the cooking chamber;
a vapor compression cooling system coupled to the housing and including a cooling coil circumscribing the at least one side wall of the crock to cool the at least one side wall of the crock by circulating fluid through the cooling coil; and
a controller coupled to the heating element and the vapor compression cooling system;
wherein the controller is configured to selectively activate the heating element and the vapor compression cooling system during a pressure cooking operation; and
wherein the controller is configured to activate the vapor compression cooling system during a depressurization portion of the pressure cooking operation to accelerate depressurization of the crock.

2. The pressure cooker of claim 1, wherein the vapor compression cooling system includes a vapor compression circuit including a compressor, a condenser, and an expansion valve through which a refrigerant circulates.

3. The pressure cooker of claim 2, wherein the cooling coil comprises an evaporator of the vapor compression circuit, and the refrigerant is the fluid circulated through the cooling coil.

4. The pressure cooker of claim 2, wherein the vapor compression circuit further includes an evaporator through which the refrigerant circulates, and the vapor compression cooling system further comprises a liquid chiller loop including a pump configured to circulate a liquid chilled by the evaporator of the vapor compression circuit, wherein the cooling coil is disposed in the liquid chiller loop and the liquid is the fluid circulated through the cooling coil.

5. The pressure cooker of claim 2, wherein the compressor, condenser, and expansion valve are disposed within the housing.

6. The pressure cooker of claim 5, wherein the condenser is disposed on an outer housing wall of the housing.

7. The pressure cooker of claim 2, wherein at least a portion of the vapor compression circuit is disposed externally from the housing.

8. The pressure cooker of claim 7, wherein the at least a portion of the vapor compression circuit is removably coupled to the housing.

9. The pressure cooker of claim 1, wherein the outer chamber is defined by an inner housing wall of the housing, and wherein the cooling coil is coupled to the inner housing wall.

10. The pressure cooker of claim 9, wherein the housing further includes an outer housing wall, and wherein the cooling coil is disposed between the inner housing wall and the outer housing wall.

11. The pressure cooker of claim 9, wherein the cooling coil is disposed between the inner housing wall and the crock.

12. The pressure cooker of claim 9, further comprising at least one heat pipe coupled to the inner housing wall of the housing wall.

13. The pressure cooker of claim 1, wherein the cooling coil is wound helically about the at least one side wall of the crock.

14. The pressure cooker of claim 13, wherein the housing includes one or more helical air channels defined between portions of the cooling coil, and the pressure cooker further comprises a housing fan disposed in the housing and configured to circulate air through the one or more helical air channels.

15. The pressure cooker of claim 1, wherein the pressure cooking operation is a delay pressure cooking operation, and the controller is configured to activate the vapor compression cooling system during a delay portion of the delay pressure cooking operation to refrigerate food in the crock during the delay portion of the delay pressure cooking operation.

16. The pressure cooker of claim 1, wherein the vapor compression cooling system is operable in a reverse heat pump mode, and the controller is configured to activate the vapor compression cooling system in the reverse heat pump mode to perform a warming operation in the crock.

17. The pressure cooker of claim 1, wherein the controller is configured to activate the vapor compression cooling system to perform a cooler operation in the crock.

18. A pressure cooker, comprising:
a housing including an outer chamber;
a crock supported within the outer chamber of the housing, the crock including at least one side wall and a bottom wall defining a cooking chamber;
a lid removably secured to the housing and configured to seal the cooking chamber;
a heating element coupled to the housing and positioned opposite the bottom wall of the crock to heat the cooking chamber;
a vapor compression cooling system coupled to the housing and including a cooling coil circumscribing the at least one side wall of the crock to cool the at least one side wall of the crock by circulating fluid through the cooling coil;

a controller coupled to the heating element and the vapor compression cooling system, wherein the controller is configured to selectively activate the heating element and the vapor compression cooling system during a pressure cooking operation; and a specialty lid including an ice cream making, mixing or blending function, wherein the controller is further configured to activate the vapor compression cooling system when the specialty lid is mounted to the housing to perform an ice cream making operation, a mixing operation, or a blending operation in the crock.

19. A pressure cooker, comprising:

a housing including an outer chamber;

a crock supported within the outer chamber of the housing, the crock including at least one side wall and a bottom wall defining a cooking chamber;

a lid removably secured to the housing and configured to seal the cooking chamber;

a heating element coupled to the housing and positioned opposite the bottom wall of the crock to heat the cooking chamber;

a vapor compression cooling system coupled to the housing and including a cooling coil circumscribing the at least one side wall of the crock to cool the at least one side wall of the crock by circulating fluid through the cooling coil;

wherein the cooling coil is wound helically about the at least one side wall of the crock; and wherein the housing includes one or more helical air channels defined between portions of the cooling coil, and the pressure cooker further comprises a housing fan disposed in the housing and configured to circulate air through the one or more helical air channels.

\* \* \* \* \*